(12) United States Patent
Boterenbrood

(10) Patent No.: US 8,337,372 B1
(45) Date of Patent: Dec. 25, 2012

(54) EXERCISE DEVICE AND METHODS OF USE

(75) Inventor: Brenda Boterenbrood, Grand Haven, MI (US)

(73) Assignee: BeachFit, LLC, Grand Haven, MI (US)

(*) Notice: Subject to any disclaimer, the term of this patent is extended or adjusted under 35 U.S.C. 154(b) by 162 days.

(21) Appl. No.: 12/875,784

(22) Filed: Sep. 3, 2010

Related U.S. Application Data

(60) Provisional application No. 61/240,629, filed on Sep. 8, 2009.

(51) Int. Cl.
*A63B 21/00* (2006.01)
*A63B 21/06* (2006.01)
*A01B 1/20* (2006.01)

(52) U.S. Cl. ............ 482/139; 482/73; 482/95; 482/106; 482/111; 482/140; 482/141; 482/148; 294/49; 7/114

(58) Field of Classification Search .................. 482/72, 482/73, 106, 109, 111, 139, 148, 95, 140; 482/141; 294/49, 50, 51, 54.5, 57, 59, 141; 294/159, 160, 176, 178, 181; 182/20, 21, 182/22, 28, 32, 34, 35, 194; 440/101, 102, 440/103; 7/114, 115, 116; D8/6, 7, 10, 11, D8/13; 463/47.2, 47.5, 47.6, 47.7
See application file for complete search history.

(56) References Cited

U.S. PATENT DOCUMENTS

| | | | |
|---|---|---|---|
| 576,756 A | 2/1897 | Cole | |
| D27,173 S * | 6/1897 | Steel | D8/7 |
| 1,229,667 A | 6/1917 | Stimecz | |
| D186,036 S * | 9/1959 | Sherman | D8/6 |
| 3,833,250 A * | 9/1974 | Lawrence | 294/50.6 |
| 4,011,612 A * | 3/1977 | Atkinson | 7/116 |
| 4,478,033 A * | 10/1984 | Konyn et al. | 56/400.06 |
| 4,610,633 A | 9/1986 | Freudenberg | |
| 4,673,361 A * | 6/1987 | Harvey | 440/101 |
| 4,682,774 A * | 7/1987 | Holy | 463/47.5 |
| 4,687,197 A | 8/1987 | Larsson et al. | |
| 4,717,145 A | 1/1988 | Chininis | |
| 4,790,585 A | 12/1988 | Vernon et al. | |
| 4,979,623 A | 12/1990 | Flanagan | |
| 5,348,503 A | 9/1994 | Fechtner | |
| 5,507,051 A | 4/1996 | Mazon | |
| 5,624,357 A | 4/1997 | Englehart et al. | |
| 5,803,876 A | 9/1998 | Hickman | |
| 5,832,563 A * | 11/1998 | Simpson | 16/110.1 |
| 5,842,830 A | 12/1998 | Franznick | |

(Continued)

FOREIGN PATENT DOCUMENTS

GB 2032288 A 5/1980

(Continued)

*Primary Examiner* — Loan Thanh
*Assistant Examiner* — Victor K Hwang
(74) *Attorney, Agent, or Firm* — Price Heneveld LLP

(57) ABSTRACT

The invention relates to an exercise device for use by a user on a selected surface material comprising a grasping member having a first end and a second end, a first tool head mounted to the first end of the grasping member and a second tool head mounted to the second end of the grasping member. Each of the first tool head and the second tool head has sufficient structural rigidity to be interacted with the surface material without significant deformation whereby a user can perform exercises upon the selected surface material by physically interacting the first tool head and second tool head with the surface material.

16 Claims, 28 Drawing Sheets

U.S. PATENT DOCUMENTS

| | | | |
|---|---|---|---|
| 5,851,132 A * | 12/1998 | Merrill | 440/101 |
| 6,106,436 A | 8/2000 | Lundahl | |
| 6,109,365 A | 8/2000 | Lamoureux et al. | |
| 6,199,245 B1 * | 3/2001 | Blessing | 16/430 |
| 6,264,519 B1 | 7/2001 | Brown | |
| 6,280,364 B1 * | 8/2001 | Deac et al. | 482/106 |
| 6,315,700 B1 | 11/2001 | Shifferaw | |
| 6,328,617 B1 | 12/2001 | Gunnell | |
| 6,328,677 B1 | 12/2001 | Drapeau | |
| 6,357,067 B1 | 3/2002 | Jones | |
| 6,763,542 B2 * | 7/2004 | Huang | 7/116 |
| 6,796,862 B1 | 9/2004 | Abbenhouse et al. | |
| 6,886,319 B2 * | 5/2005 | Nam | 56/400.12 |
| 7,090,618 B2 | 8/2006 | Stout et al. | |
| 7,219,382 B2 | 5/2007 | Johnson | |
| 7,335,143 B2 | 2/2008 | Lundahl | |
| D578,846 S | 10/2008 | Coats | |
| 7,703,822 B1 * | 4/2010 | Giacalone | 294/51 |
| 7,951,051 B1 * | 5/2011 | Brown | 482/126 |
| 2003/0083178 A1 | 5/2003 | Gilman | |
| 2003/0130096 A1 * | 7/2003 | LaCroce | 482/106 |
| 2004/0261188 A1 | 12/2004 | Mathis | |
| 2006/0264128 A1 | 11/2006 | Osten | |
| 2008/0280738 A1 | 11/2008 | Brennan et al. | |
| 2009/0036276 A1 | 2/2009 | Loach | |
| 2009/0093349 A1 | 4/2009 | Cooper | |
| 2010/0204020 A1 | 8/2010 | Thomas et al. | |

FOREIGN PATENT DOCUMENTS

| | | | |
|---|---|---|---|
| GB | 2339663 A * | 2/2000 | |
| GB | 2342027 A | 4/2000 | |
| KR | 2009111741 A * | 10/2009 | |
| WO | 9200780 | 1/1992 | |

* cited by examiner

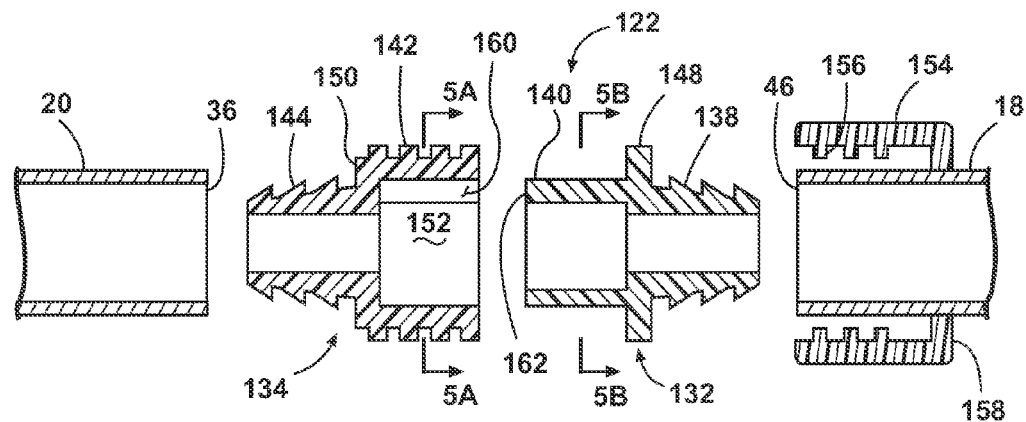
Fig. 4A
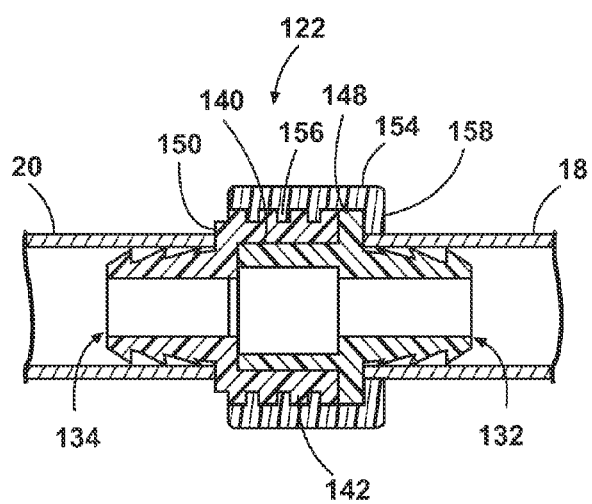
Fig. 4B
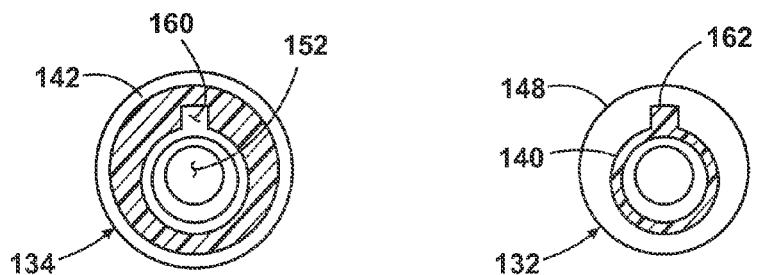
Fig. 5AFig. 5B

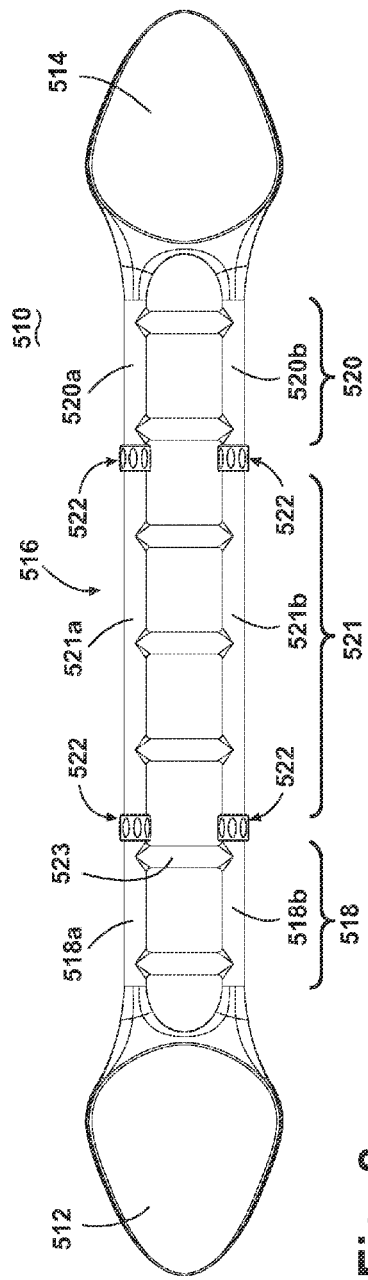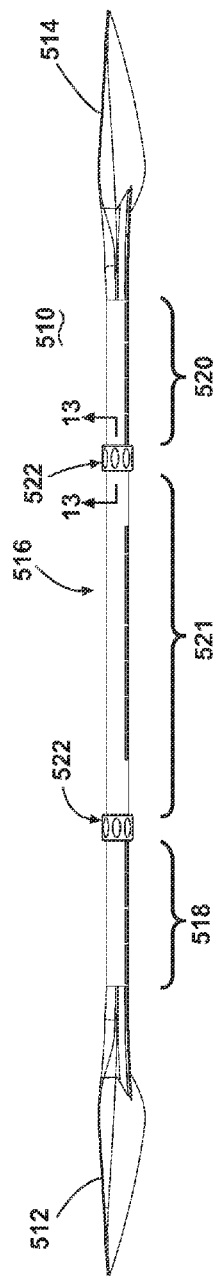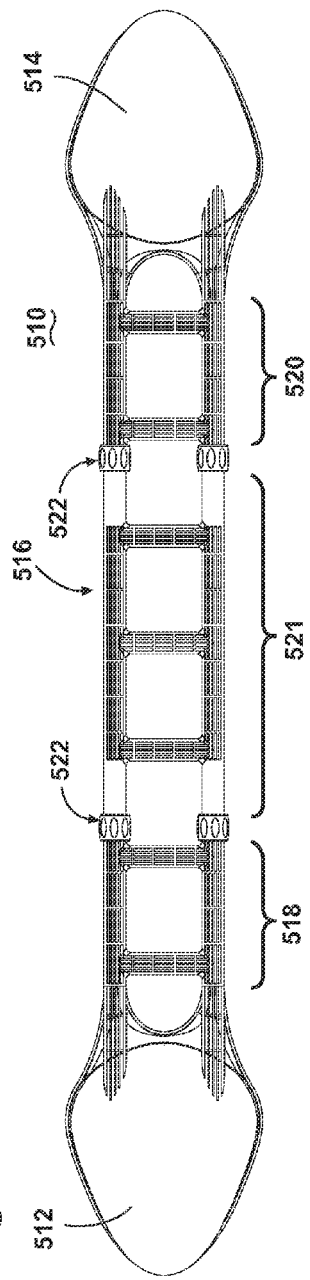
Fig. 8
Fig. 9
Fig. 10

EXERCISE DEVICE AND METHODS OF USE

CROSS REFERENCE TO RELATED APPLICATIONS

The present application claims the benefit of U.S. Provisional Patent Application No. 61/240,629, filed Sep. 8, 2009, which is incorporated herein by reference in its entirety.

BACKGROUND OF THE INVENTION

1. Background

The invention generally relates to the field of exercise devices and their method of use.

2. Description of the Related Art

Rowing a boat or paddling a kayak are activities that are known to provide an individual with good exercise by increasing the heart rate and training muscles. A variety of exercise equipment has been developed to simulate the motions of rowing or paddling that allow a user to obtain the benefits of these types of activities in a gym or home setting. However, many of these devices, such as those disclosed in U.S. Pat. Nos. 4,687,197 to Larsson et al., 4,717,145 to Chininis, and 7,335,143 to Lundahl can be large, bulky devices that require a lot of room for storage, have multiple components and can often be very expensive. Slightly more portable exercise devices have been developed, such as those disclosed in U.S. Patent Application No. 2008/0280738 to Brennan et al. and U.S. Pat. No. 6,328,677 to Drapeau, however they require securing the device to a stable structure, which can limit the ease of portability of the device and in the case of U.S. Pat. No. 6,328,677 can still have multiple moving components. Even devices such as those disclose in U.S. Patent Application No. 2009/0036276 and U.S. Pat. No. 5,803,876, which do not require securing to stable structure, are still bulky and not easily portable from place to place. U.S. Patent Application No. 2010/0204020 to Thomas et al. discloses an exercise device for mimicking a canoe paddle, however it has moving parts which limit its use in outdoor settings. In addition, these smaller devices are often only capable of assisting the user in performing a limited number of exercises and training a limited number of muscle groups.

Traditional kayak paddles, such as those disclosed in U.S. Pat. Nos. 6,796,862 to Abbenhouse et al., 4,610,633 to Freudenberg, 5,842,830 to Franznick and 6,328,617 to Gunnell are typically designed to be light weight and only meant for use in paddling through water.

BRIEF DESCRIPTION

According to one embodiment, an exercise device for use by a user on a selected surface material comprises a grasping member having a first end and a second end, a first tool head mounted to the first end of the grasping member and a second tool head mounted to the second end of the grasping member. Each of the first tool head and the second tool head have sufficient structural rigidity to be interacted with the surface material without significant deformation whereby a user can perform exercises upon the selected surface material by physically interacting the first tool head and second tool head with the surface material.

According to another embodiment, the grasping member comprsies a rod extending between the first tool head and the second tool head.

According to yet another embodiment, the grasping member comprises at least two rods extending between the first tool head and the second tool head, generally in parallel relationship with one another. The grasping member can further comprise at least one cross member extending between the at least two rods. The at least one cross member can comprise a plurality of cross members extending between the at least two rods, whereby a user can grasp the plurality of cross members as well as the at least two rods while exercising.

According to another embodiment, at least one of the first tool head and the second tool head comprises a scooping member adapted to collect the surface material therein as it is dragged across the surface material. The grasping member can comprise at least two rods extending between the first tool head and the second tool head, generally in parallel relationship with one another, and at least one cross member extending between the at least two rods, and wherein the scooping member on each of the first tool head and the second tool head has a scooping plane generally planar with the at least two rods and the at least one cross member.

According to yet another embodiment, at least one of the first tool head and the second tool head comprises a tool head selected from a shovel head, a pitchfork, a snow shovel head, a rake, a bucket, a sand bag, a liquid container and a spade. The first tool head and the second tool head can be formed as the same tool head as the other.

According to another embodiment, the surface material comprises at least one of sand, dirt, water, snow, mud and gravel.

According to yet another embodiment, the first tool head and the second tool head are detachably mounted to the grasping member. The first tool head and the second tool head can be mounted to the grasping member by at least one of a set screw, a quick-release coupler, a releasable detent mechanism, a screw-nut assembly and combinations thereof.

According to another embodiment, the grasping member comprises a plurality of sections detachably coupled to one another by a coupling device. The coupling device can be selected from at least one of a set screw, a quick-release coupler, a releasable detent mechanism and a screw-nut assembly.

According to yet another embodiment, a user positioned on the surface material can exercise with the exercise device by alternately sweeping the first tool head and the second tool head across the surface material, collecting some of the surface material in each of the first tool head and the second tool head on alternate passes, and dispensing the collected surface material on a subsequent pass.

According to another embodiment, a user can simulate lifting weights with the exercise device by placing a selected amount of the surface material within each of the first tool head and the second tool head and periodically lifting and lowering the exercise device, with the selected amount of surface material providing the exercise device with additional weight.

BRIEF DESCRIPTION OF THE DRAWINGS

In the drawings:

FIGS. 4A and 4B are an exploded view and an assembled view, respectively, of a coupling device according to a third embodiment of the invention.

FIG. 5A is a cross-section of the coupling device of FIGS. 4A and 4B taken along the line 5A-5A in FIG. 4A according to the third embodiment of the invention.

FIG. 5B is a cross-section of the coupling device of FIGS. 4A and 4B taken along the line 5B-5B in FIG. 4A according to the third embodiment of the invention.

FIG. 8 is a top view of an exercise device according to a seventh embodiment of the invention.

FIG. 9 is a side view of the exercise device of FIG. 8 according to the seventh embodiment of the invention.

FIG. 10 is a bottom view of the exercise device of FIG. 8 according to the seventh embodiment of the invention.

DESCRIPTION OF AN EMBODIMENT OF THE INVENTION

Figure 1:
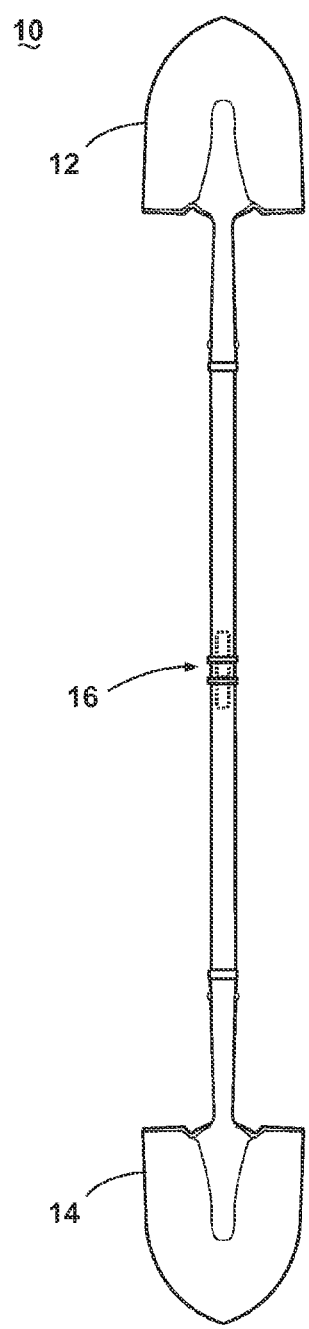
FIG. 1 is a front perspective view of an exercise device according to a first embodiment of the invention.

FIG. 1 illustrates an exercise device 10 according to an embodiment of the invention. The exercise device 10 includes a first and second tool head 12 and 14 coupled at opposite ends of a grasping member 16, which can be in the form of a shaft or rod. While the first and second tool heads 12 and 14 are illustrated as resembling a shovel, the first and second tool heads 12 and 14 can be formed so as to resemble any known tool for interacting with any type of surface material, non-limiting examples of which include sand, soil, snow, water, mud or gravel. Non-limiting examples of tool heads include a spade, hoe, shovel, snow shovel, pitch fork, rake, bucket, sand bag and liquid container.

Figure 2:
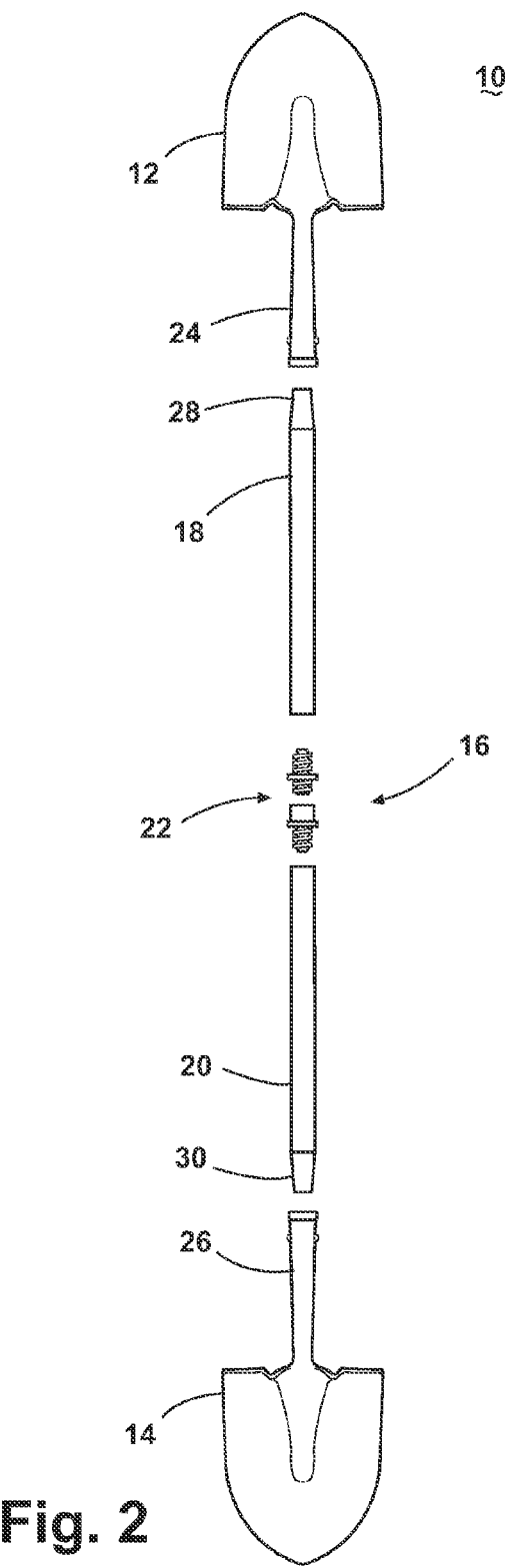
FIG. 2 is an exploded view of the exercise device of FIG. 1 according to the first embodiment of the invention.

Referring now to FIG. 2, the shaft 16 comprises a first handle portion 18 and a second handle portion 20 that can be removably coupled using a coupling device 22. Each of the first and second tool heads 12 and 14 can be provided with a neck portion 24 and 26, respectively, for coupling with the first and second handle portions 18 and 20. The first handle portion 18 can have a first end 28 sized for receipt within the neck portion 24 of the first tool head 12. The first end 28 can be secured within the neck portion 24 in any suitable manner such as by an interference fit or using any suitable mechanical or non-mechanical fastener such as one or more screws, an adhesive or weld. The second handle portion 20 can have a first end 30 sized for receipt within the neck portion 26 of the second tool head 14. The first end 30 can be secured within the neck portion 26 in the same manner in which the first end 28 of the first handle portion can be secured within the neck portion 24 of the first tool head 12.

The first and second tool heads 12 and 14 and the shaft 16 can be made from any combination of any suitable material such as metal or a polymeric material, such as a rigid plastic material. For example, the first and second tool heads 12 and 14 can be made from metal and the shaft 16 can be made from plastic. If the shaft 16 is made from plastic, the shaft 16 can be provided with a plurality of radial structural support ribs extending partially or entirely along the length of the shaft 16. In another example, the exercise device 10 can be made entirely from plastic. The first and second handle portions 18, 20 can also be provided with grip portions in the form of raised ridges or bumps or padding, as is known in the art. The length of the shaft 16 can be any suitable length depending on the size of the user, but is preferably approximately 30-40 inches in length. The first and second tool heads 12, 14 can lie in the same plane relative to the shaft 16 such that the first tool head 12 is a mirror image of the second tool head 14 relative to a dividing plane through the center of the device 10, perpendicular to the shaft 16.

Figure 3A:
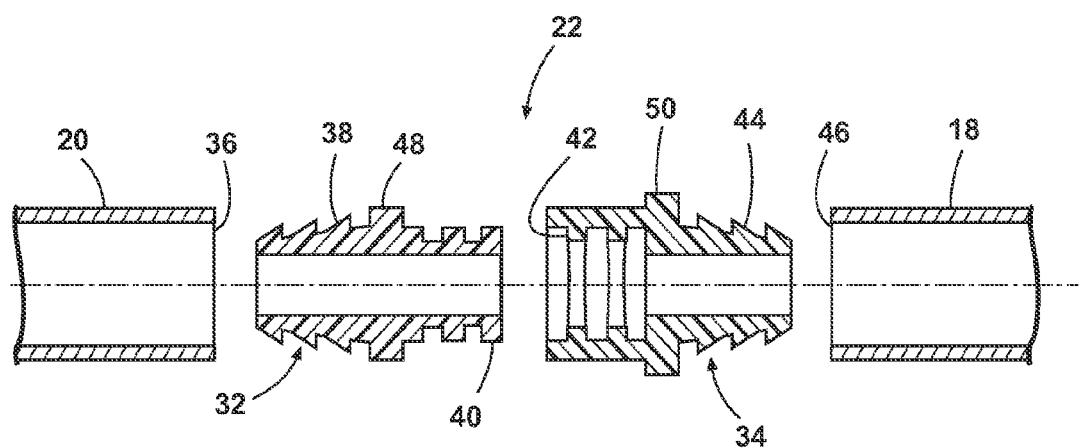
FIGS. 3A and 3B are an exploded view and an assembled view, respectively, of a coupling device according to a second embodiment of the invention.
Figure 3B:
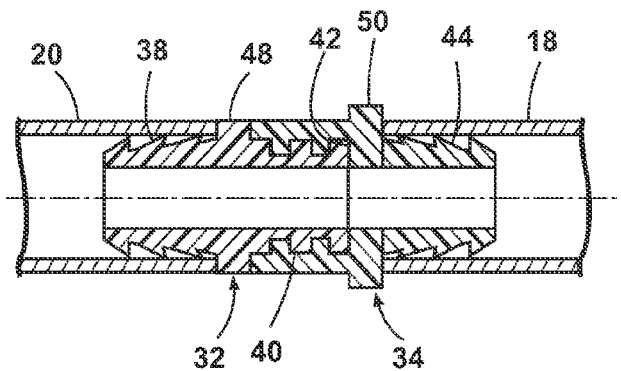

The exercise device 10 can also be provided with the coupling device 22 for removably coupling the first and second handle portions 18 and 20. As illustrated in FIGS. 3A and 3B, the coupling device 22 can be in the form of a screw-nut assembly. The coupling device 22 can comprise a male fitting 32 and a female fitting 34. The male fitting 32 can be inserted into an open end 36 of the second handle portion 20. The male fitting 32 can have a first threaded portion 38 for coupling with a set of threads located within the open end 36 of the second handle portion 20 (not shown). The male fitting 32 can also have a second threaded portion 40 for mating with a threaded shaft 42 of the female fitting 34 as illustrated in FIG. 3B. The female fitting 34 can also include a first threaded portion 44 for coupling with a set of threads located within an open end 46 of the first handle portion 18 (not shown). Each of the male fitting 32 and female fitting 34 can be provided with a peripheral flange 48 and 50, respectively, for limiting the distance the male and female portions 32 and 34 can be inserted into the first and second handle portions 18 and 20, respectively. As can be seen in FIG. 3B, when assembled, the coupling device 22 removably secures the first and second handle portions 18 and 20.

While the male fitting 32 and female fitting 34 of the coupling device 22 are illustrated as coupling with the first and second handle portions 18 and 20 using a threaded assembly, it is within the scope of the invention for the male fitting 32 and female fitting 34 to be coupled with the first and second handle portions 18 and 20 in any suitable removable or non-removable manner. For example, the male fitting 32 and female fitting 34 can be secured to the first and second handles 18 and 20, respectively, using an interference fit. In another example, the male fitting 32 and female fitting 34 can be secured to the first and second handles 18 and 20, respectively using a non-mechanical fastener such as an adhesive or a weld. It is also within the scope of the invention for the male fitting 32 to be coupled with the first handle portion 18 and the female fitting 34 to be coupled with the second handle portion 20.

The male and female fittings 32 and 34 can be made from any combination of any suitable material such as metal or a polymeric material such as plastic.

FIGS. 4A and 4B illustrate an example of a suitable coupling device 122 for use with the invention. The coupling device 122 is similar to the coupling device 22 except in the manner in which a male fitting 132 is removably coupled with a female fitting 134. Therefore, elements of the coupling device 122 similar to the coupling device 22 will be numbered with the prefix 100.

Similar to the coupling device 22 illustrated in FIGS. 3A and 3B, the male fitting 132 and female fitting 134 can comprise a first threaded portion 138 and 144 for coupling with the second and first handles 20 and 18 at their respective open ends 36 and 46. The male fitting 132 can comprise a second, non-threaded portion 140 and a peripheral flange 148 for limiting the depth of insertion of the male fitting 132 into the open end 46 of the first handle portion 18. The female fitting 134 can comprise a second, externally threaded portion 142 having a cavity 152 sized for receipt of the second, non-threaded portion 140 of the male fitting 132. The female fitting 134 also has a peripheral flange 150 for limiting the depth of insertion of the female fitting 134 into the open end 36 of the second handle portion 20.

As can best be seen in FIG. 4B, to removably secure the male fitting 132 within the female fitting 134, the coupling assembly 122 can be provided with a slidable, rotatable collar 154. The collar 154 can comprise a threaded portion 156 and a distal flange 158. When the male fitting 132 is coupled with the female fitting 134, the collar 154 can be slid along the first handle portion 18 and rotated such that the threaded portion 156 of the collar 154 engages the threaded portion 142 of the female fitting 134. When in the coupled position as illustrated in FIG. 4B, the distal flange 158 of the collar 154 abuts the peripheral flange 148 of the male fitting 132 preventing the male fitting 132 from being uncoupled from the female fitting 134. In this manner, the first and second handles 18 and 20 can be removably coupled.

As illustrated in FIGS. 5A and 5B, the coupling device 122 can also be provided with an alignment guide to facilitate coupling the first and second handle portions 18 and 20 in a desired relative orientation. The female fitting 134 can be provided with an internal groove 160 extending longitudinally within externally threaded portion 142 adjacent to and in fluid communication with the cavity 152. As illustrated in FIG. 5B, the non-threaded portion 140 of the male fitting 132 can comprise a projection 162 sized for receipt by the groove 160. In this manner, the non-threaded portion 140 can only be received within the cavity 152 when the male fitting 132 is aligned with the female fitting 134 such that the groove 160 and projection 162 are in alignment. In this manner, the first and second handle portions 18 and 20 can therefore be coupled using the coupling device 122 in a desired orientation relative to one another.

Figure 6:
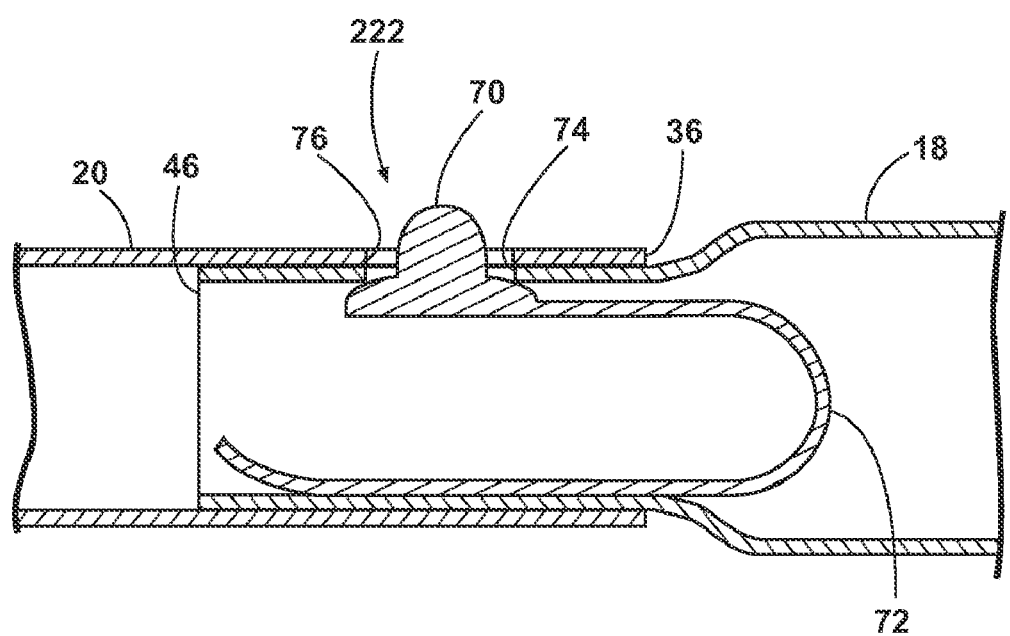
FIG. 6 is a cross section of a coupling device according to a fourth embodiment of the invention.

FIG. 6 illustrates another coupling device 222 for removably coupling the first and second handle portions 18, 20. The coupling device 222 can be in the form of a spring detent assembly comprising a button 70 coupled with a resilient wire portion 72. The coupling device 222 can be mounted within the open end 46 of the first handle portion 18 such that the button 70 resiliently extends through an aperture 74 in the first handle portion 18 adjacent the open end 46. The open end 46 of the first handle portion 18 can be tapered such that the open end 46 can be received within the open end 36 of the second handle portion 20. The second handle portion 20 can comprise an aperture 76 located adjacent the open end 36 such that when the first handle portion 18 is received by the second handle portion 20, the button 70 extends through the aperture 76 in the second handle portion 20 removably securing the first and second handle portions 18 and 20. To uncouple the first and second handle portions 18, 20, the button 70 can be depressed against the biasing force of the resilient wire 72 such that the first handle portion 18 can be withdrawn. The resilient wire 72 can be secured within the first handle portion 18 using any suitable mechanical fastener, such as a screw, or non-mechanical fastener, such as an adhesive or weld.

While the exercise device 10 illustrated in FIG. 6 is shown having only one aperture 76 in the second handle portion 20, it is within the scope of the invention for the second handle portion 20 to have multiple, spaced apertures extending longitudinally down the length of the second handle portion 20. In this manner the total length of the assembled shaft 16 can be adjusted by a user depending on how far the first handle portion 18 is inserted within the second handle portion 20 and which of the apertures on the second handle portion 20 the button 70 extends through.

While the exercise device 10 has been described as comprising first and second handle portions 18 and 20 that can be removably coupled, it is within the scope of the invention for the exercise device 10 to comprise any number of handle portions that can be removably coupled according to any of the embodiments described herein. It is also within the scope of the invention for the exercise device 10 to comprise a single handle portion. It is also within the scope of the invention for the tool heads 12 and 14 to be removably secured to the shaft 16 using any of the coupling devices described herein. The first and second tool heads 12 and 14 can be the same type of tool head, as illustrated in FIG. 1, or the first and second tool heads 12 and 14 can be in the form of different tools.

Figure 7A:
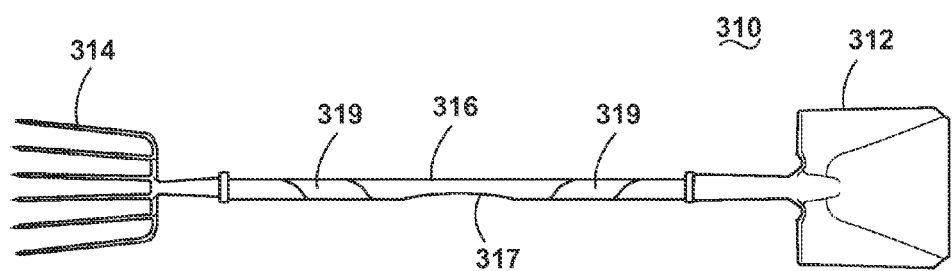
FIGS. 7A-7B are front perspective views of an exercise device according to a fifth and sixth embodiment of the invention.
Figure 7B:
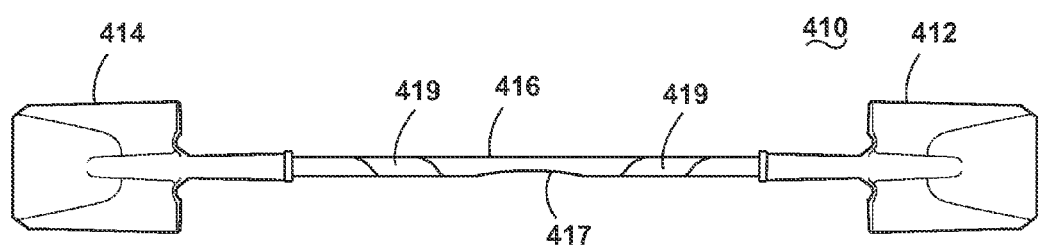
Figure 11:
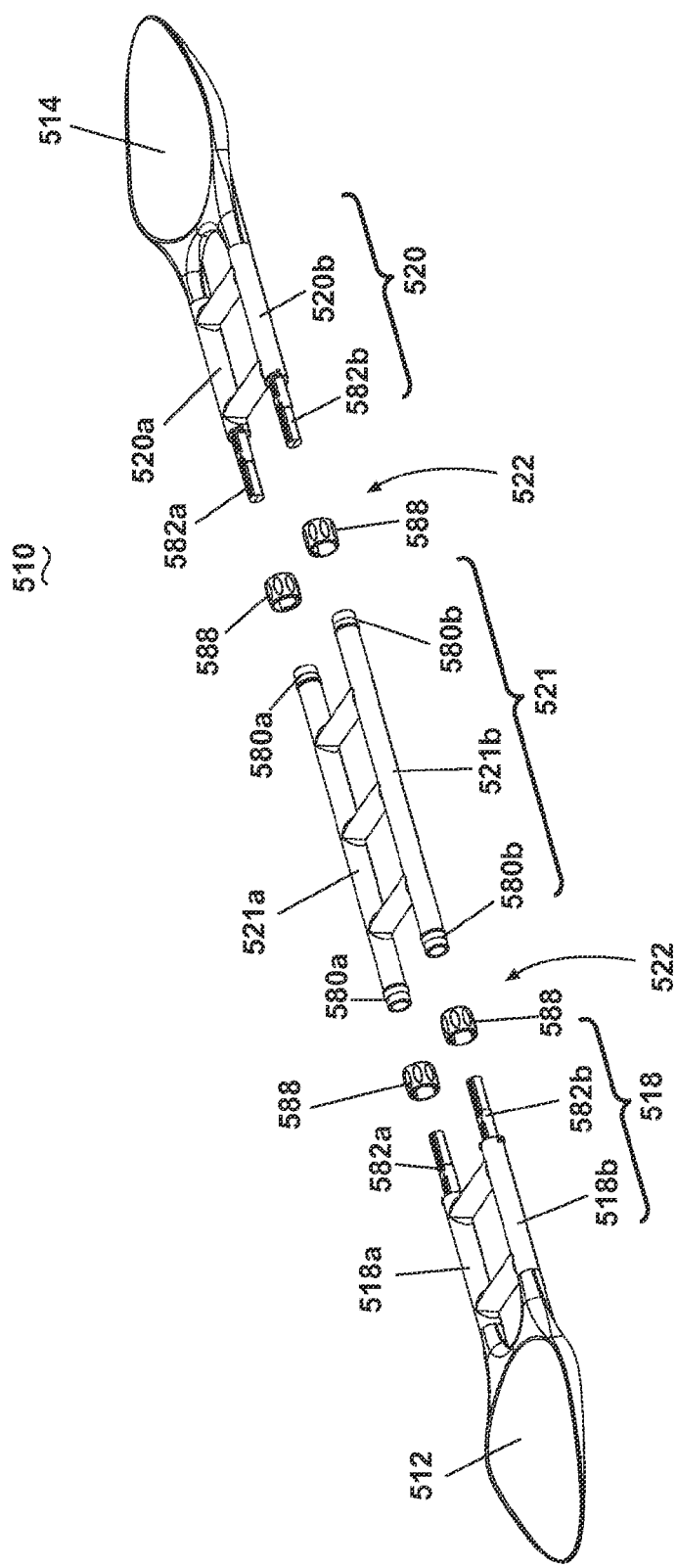
FIG. 11 is a partial exploded view of the exercise device of FIG. 8 according to the seventh embodiment of the invention.

FIGS. 7A and 7B illustrate exercise devices 310 and 410 that are similar to the exercise device 10. Therefore, elements in the exercise devices 310 and 410 similar to those in exercise device 10 are labeled with the prefix 300 and 400, respectively.

As illustrated in FIG. 7A, the exercise device 310 can comprise a first and second tool head 312 and 314 coupled at opposite ends of a shaft 316 that are in the form of different tools. The first tool head 312 can be in the form of a shovel or spade while the second tool head 314 can be in the form of a rake. The shaft 316 can be a single shaft that is releasably or unreleasably coupled with the first and second tools heads 312 and 314. The shaft 316 can be provided with a narrowed waist portion 317 and hand grips 319. The hand grips 319 can be in the form of raised ridges or bumps or padding, as is known in the art.

As illustrated in FIG. 7B, the exercise device 410 comprises a first and second tool head 412 and 414 coupled at opposite ends of a shaft 416. The first and second tool heads 412 can be in the form of a shovel or spade. The shaft 416 can be a single shaft that is releasably or unreleasably coupled with the first and second tool heads 412 and 414. The shaft 416 can be provided with a narrowed waist portion 417 and hand grips 419. The hand grips 419 can be in the form of raised ridges or bumps or padding, as is known in the art.

FIGS. 8-13 illustrate another embodiment of the invention comprising an exercise device 510, which is similar to the exercise device 10 except for the structure of a shaft 516 and a coupling device 522. Therefore, elements in the exercise device 510 similar to those of exercise device 10 will be numbered with the prefix 500. The exercise device 510 includes a first and second tool head 512 and 514 coupled at opposite ends of a shaft 516.

Referring now to FIGS. 8-11, the shaft 516 comprises a first handle portion 518 connected with the first tool head 512 and a second handle portion 520 connected with the second tool head 514. The first and second handle portions 518, 520 are removably coupled with a central handle portion 521. The first handle portion 518 can further comprise a pair of parallel shaft arms 518a and 518b which can be removably coupled with a pair of parallel shaft arms 521a and 521b of a first end of the central handle portion 521 by a pair of coupling devices 522. Similarly, the second handle portion 520 can comprise a pair of parallel shaft arms 520a, 520b which can be removably coupled with the shaft arms 521a, 521b of the central handle portion 521 at a second end opposite the first end by a pair of coupling devices 522. The first and second tool heads 512, 514 can lie in the same plane relative to the shaft 516 such that the first tool head 512 is a mirror image of the second tool head 514 relative to a dividing plane through the center of the device 510, perpendicular to the shaft 516.

The exercise device 510 is further provided with a plurality of cross members 523 extending between the parallel shaft arms 518a, b, 520a,b and 521a, b along the length of the shaft 516. The cross members 523 can be regularly or irregularly spaced along the length of the shaft 516. In addition, it is within the scope of the invention for shaft 516 to not include the cross members 523 or to include any number of cross members 523.

Figure 12:
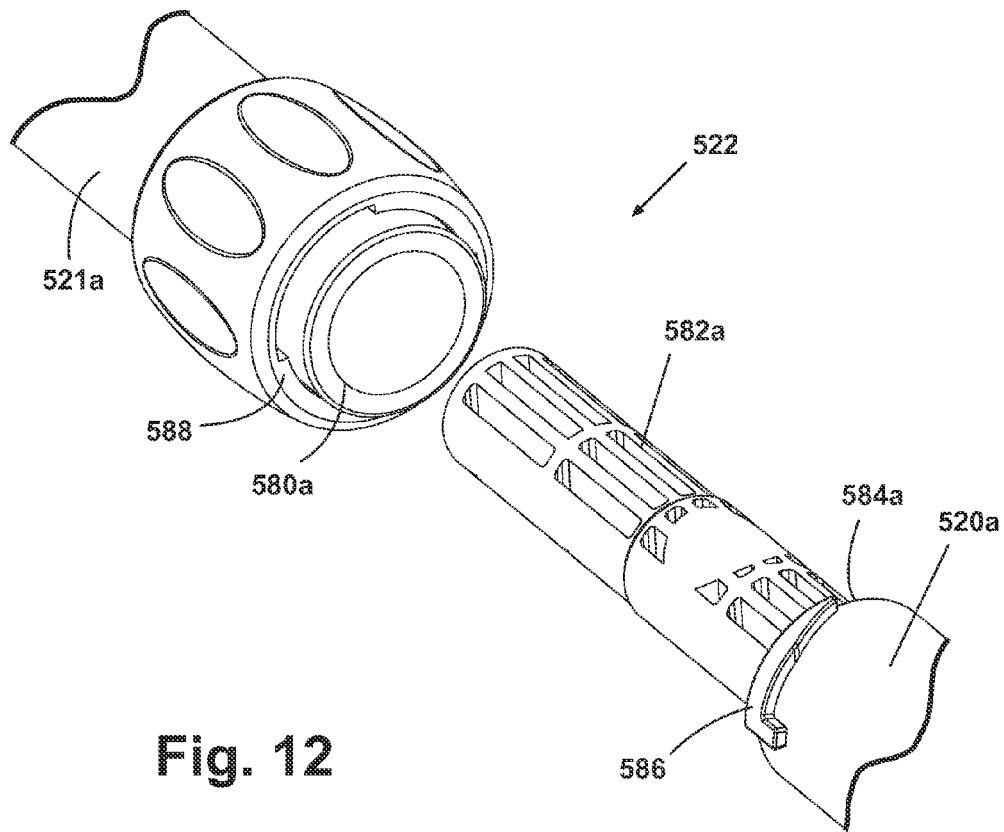
FIG. 12 is a perspective view of a coupling device for use with the exercise device of FIG. 8 according to an eight embodiment of the invention.
Figure 13:
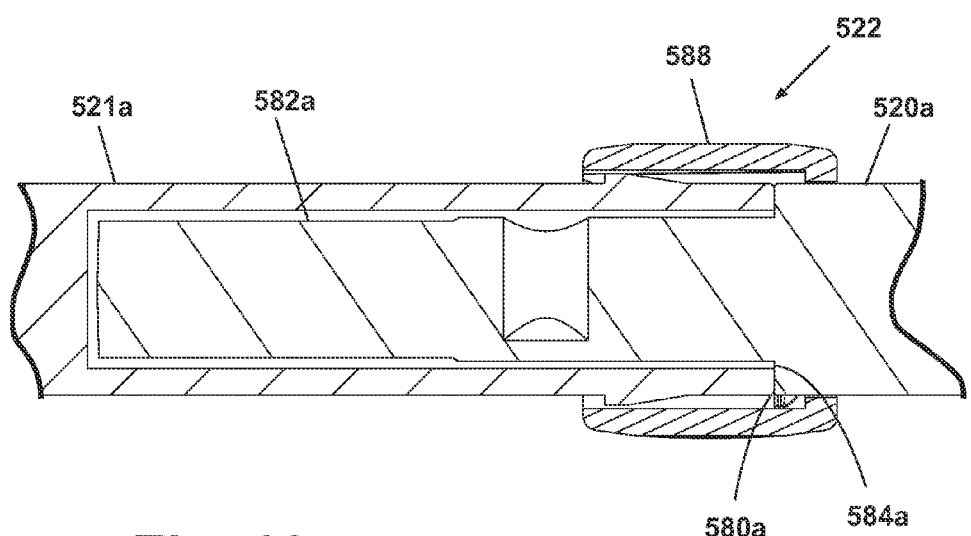
FIG. 13 is a cross-sectional view taken along line 13-13 of FIG. 9.

FIGS. 12 and 13 illustrate a manner in which the coupling devices 522 can be used to connect the first and second handle portions 518 and 520 to the central handle portion 521. FIGS. 12 and 13 illustrate the coupling of one of the shaft arms 521a of the central handle portion 521 with one of the shaft arms 520a of the second handle portion 520 with it being understood that the coupling of the other shaft arms 521b with 520b and 518a, b with 521a, b, respectively, can be done in a similar manner.

The shaft arm 521a of the central handle portion 521 can be in the form of a tube, at least a portion of which is hollow and having an open end 580a for receipt of a shaft extension 582a extending from a first end 584a of the shaft arm 520a of the second handle portion 520. The first end 584a has a diameter larger than the shaft extension 582a generally corresponding to the diameter of the open end 580a to limit the depth by which the shaft arm 520a is received within the shaft arm 521a.

The first end 584 is provided with a key feature 586 which is received by a coupler sleeve 588 carried by the shaft arm 521a, in a manner similar to that of a quick-release coupler, as is known in the art. When the shaft extension 582a is received by the open end 580a of the shaft arm 521a, the coupler sleeve 588 can be slid over the key feature 586 and rotated so as to lock with the key feature 586, as illustrated in FIG. 13. In this manner, the second handle portion 520 can be releasably coupled with the central handle portion 521. It is also within the scope of the invention for the coupler sleeve 588 to be carried by the second handle portion 520 and the shaft extension 582 and key feature 586 to be carried by the central handle portion 521.

FIGS. 14-18 illustrate another embodiment of the invention comprising an exercise device 610, which is similar to the exercise device 510 except for a coupling device 622. Therefore, elements in the exercise device 610 similar to those of exercise device 510 will be numbered with the prefix 600.

Figure 14:
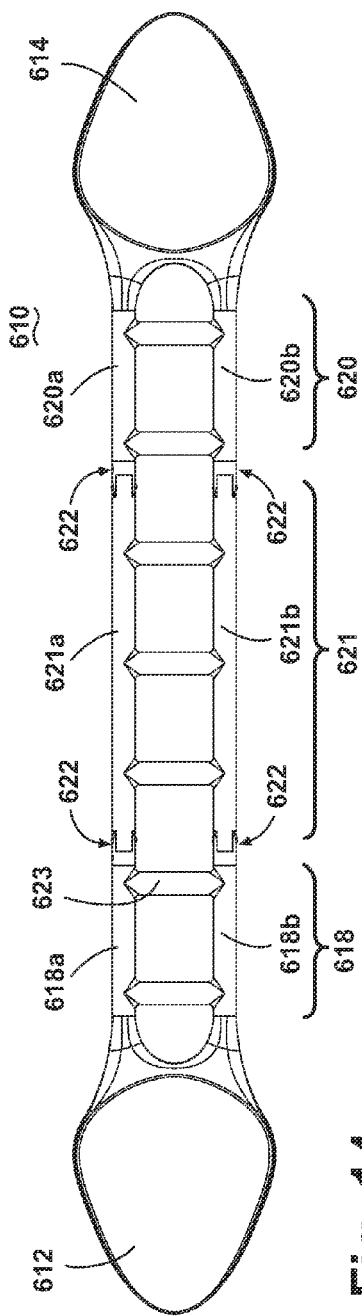
FIG. 14 is a top view of an exercise device according to a ninth embodiment of the invention.
Figure 15:
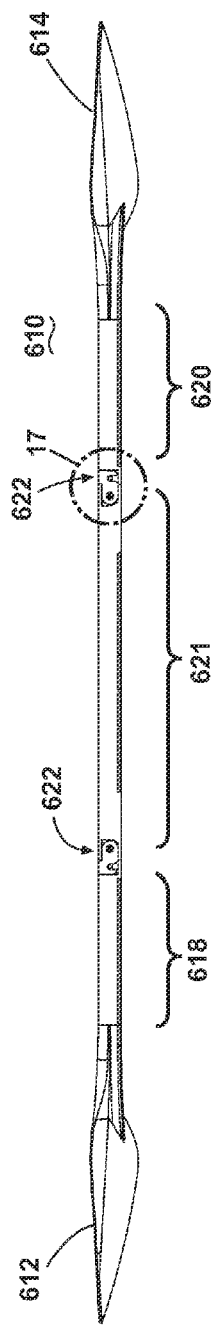
FIG. 15 is a side view of the exercise device of FIG. 14 according to the ninth embodiment of the invention.
Figure 16:
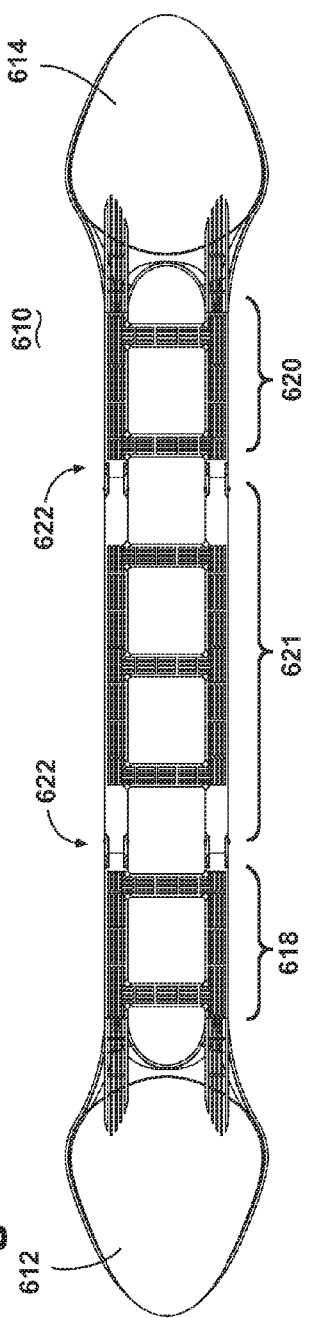
FIG. 16 is a bottom view of the exercise device of FIG. 14 according to the ninth embodiment of the invention.

Referring now to FIGS. 14-16, the exercise device 610 comprises first and second handle portions 618, 620 which are removably coupled with a central handle portion 621. The first handle portion 618 can further comprise a pair of parallel shaft arms 618a and 618b which can be releasably coupled with a pair of parallel shaft arms 621a and 621b of a first end of the central handle portion 621 by a pair of coupling devices 622. Similarly, the second handle portion 620 can comprise a pair of parallel shaft arms 620a, 620b which can be removably coupled with the shaft arms 621a, 621b of the central handle portion 621 at a second end opposite the first end by a pair of coupling devices 622.

Figure 17:
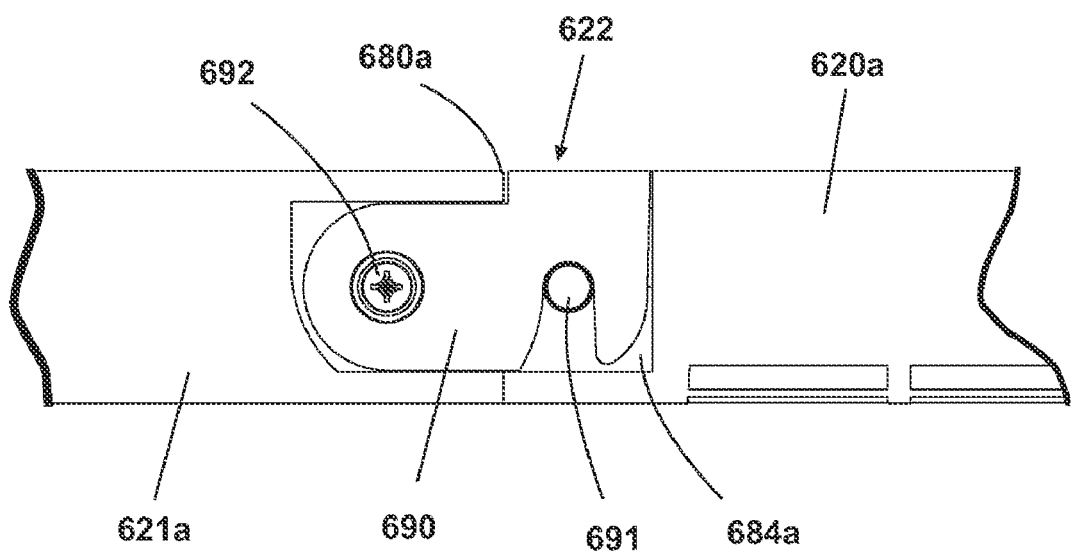
FIG. 17 is a side view of a coupling device for use with the exercise device of FIG. 14 according to a tenth embodiment of the invention.
Figure 18:
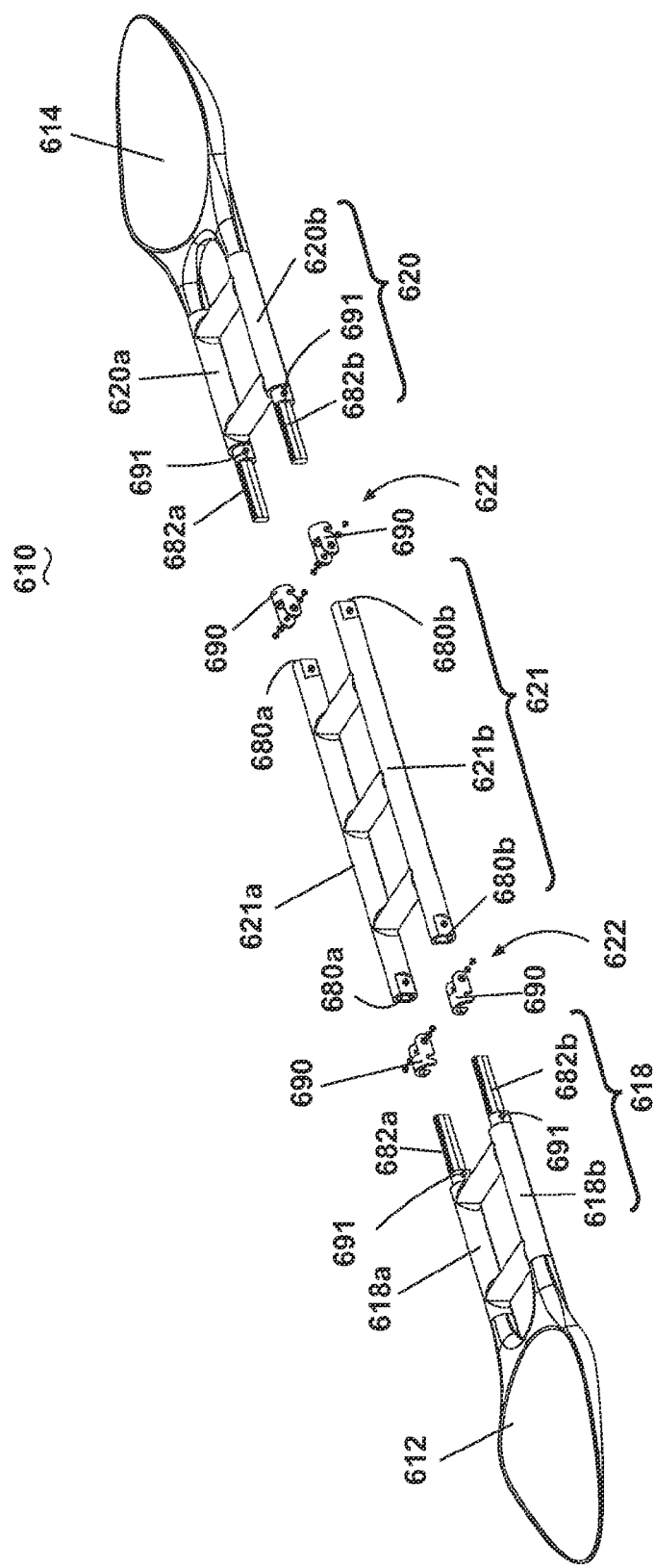
FIG. 18 is a partially exploded view of the exercise device of FIG. 14 according to the ninth embodiment of the invention.
Figure 19:
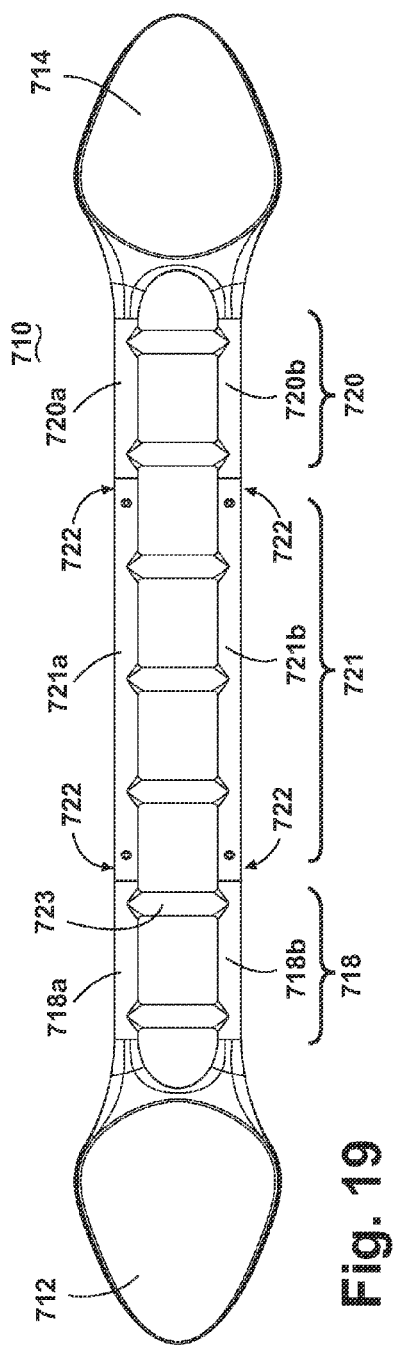
FIG. 19 is a top view of an exercise device according to an eleventh embodiment of the invention.
Figure 20:
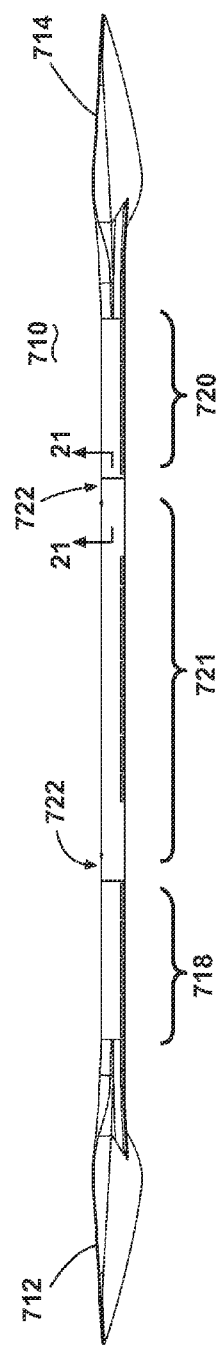
FIG. 20 is a side view of the exercise device of FIG. 19 according to the eleventh embodiment of the invention.

As can best be seen in FIGS. 17 and 18, the coupling device 622 is in the form of a hinge arm 690 which engages a detent 691. The hinge arm 690 can be rotatably coupled with the open ends 680a, b of the shaft arms 621a, b using a plurality of screws or set pins 692, as is known in the art. The detent 691 can be carried by the shaft extensions 682a, b of the shaft arms 618a, b and 620a, b of the first and second handle portions 618 and 620, respectively.

When the shaft extensions 682a, b of the second handle portion 620 are inserted into the corresponding open ends 680a, b of the central handle portion 621, the hinge arms 690 can be rotated about the screws 692 to engage the detents 691 of the second handle portion 620. The first handle portion 618 can be coupled with the central handle portion 621 in a similar manner.

FIGS. 19-22 illustrate another embodiment of the invention comprising an exercise device 710, which is similar to the exercise device 510 except for a coupling device 722. Therefore, elements in the exercise device 710 similar to those of exercise device 510 will be numbered with the prefix 700.

The exercise device 710 comprises first and second handle portions 718, 720 which are removably coupled with a central handle portion 721. The first handle portion 718 can further comprise a pair of parallel shaft arms 718a and 718b which can be releasably coupled with a pair of parallel shaft arms 721a and 721b of a first end of the central handle portion 721 by a pair of coupling devices 722. Similarly, the second handle portion 720 can comprise a pair of parallel shaft arms 720a, 720b which can be removably coupled with the shaft arms 721a, 721b of the central handle portion 721 at a second end opposite the first end by a pair of coupling devices 722.

Figure 21:
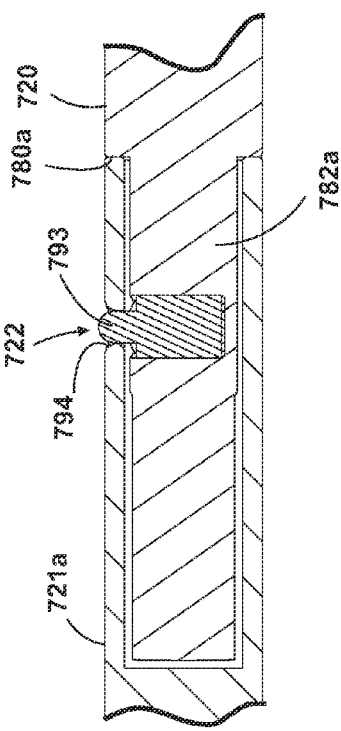
FIG. 21 is a cross-section of a coupling device for use with the exercise device of FIG. 19 according to a twelfth embodiment of the invention.
Figure 22:
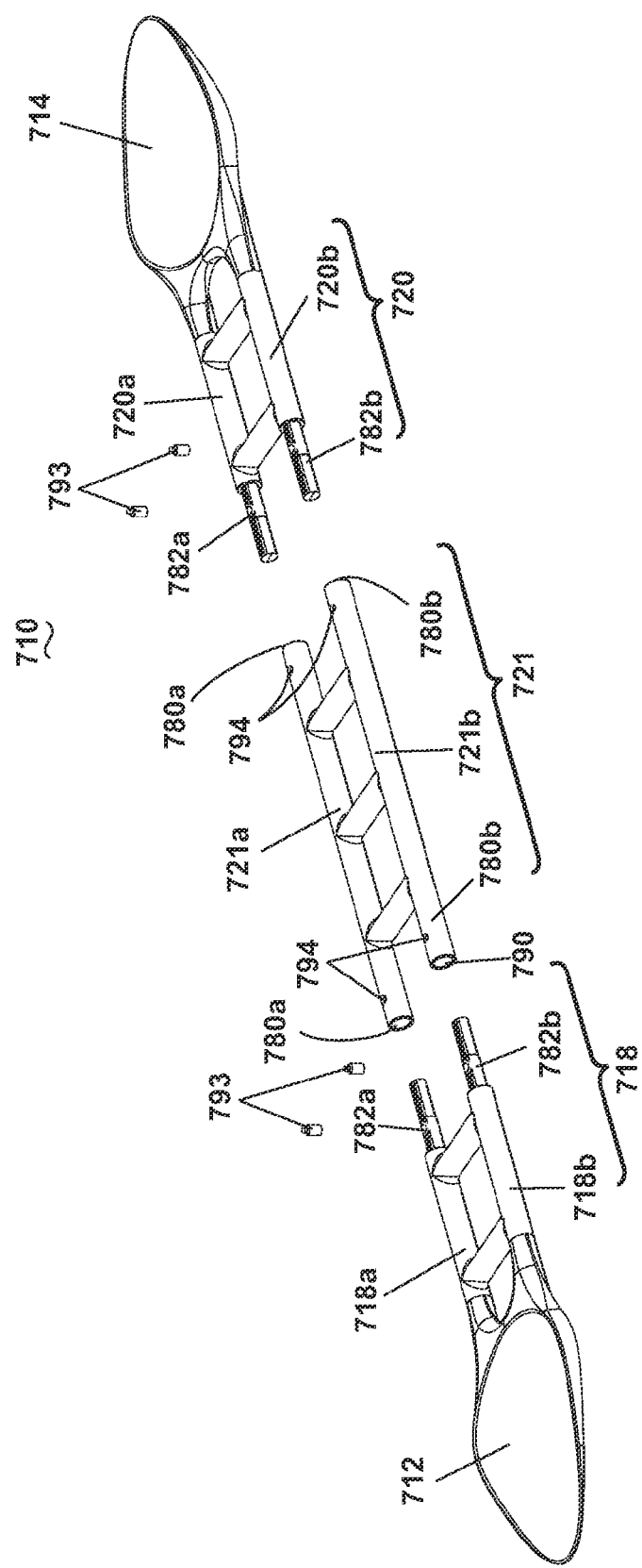
FIG. 22 is a partially exploded view of the exercise device of FIG. 19 according to the eleventh embodiment of the invention.

As can best be seen in FIGS. 21 and 22, the coupling device 722 can be in the form of a resiliently mounted detent 793 carried by the shaft extensions 782a, b of the first and second handle portions 718 and 720. The detent 793 can be received by a corresponding aperture 794 provided in the shaft arms 721a, b of the central handle portion 721 when the shaft extensions 782a, b of the first and second handle portions 718 and 720 are inserted into the open ends 780a, b of the central handle portion 721.

Figure 23:
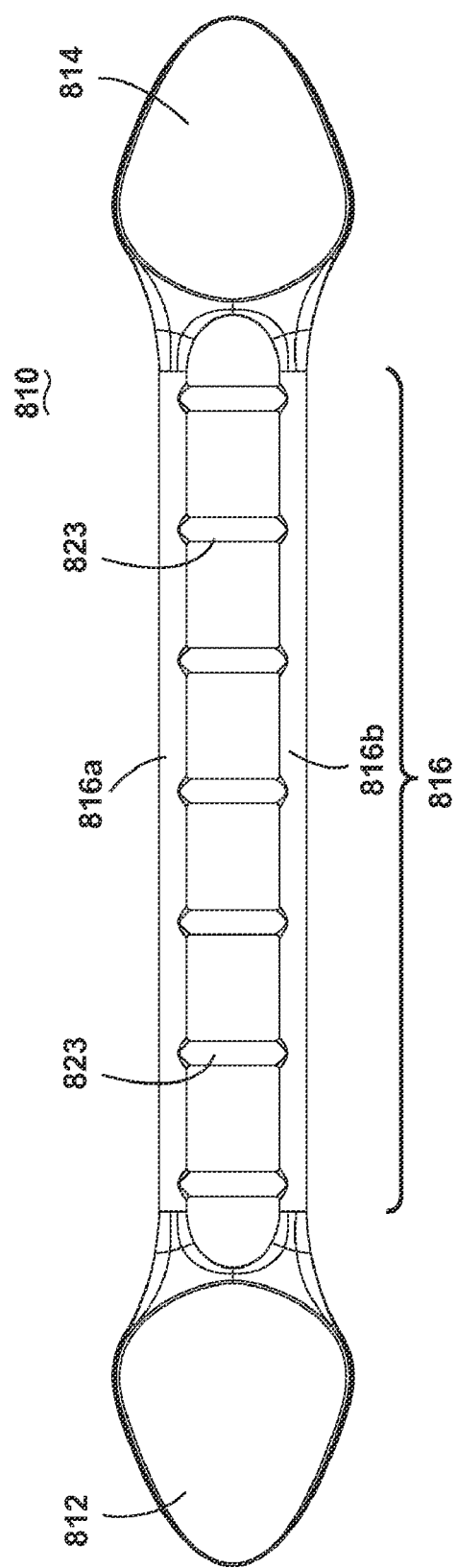
FIG. 23 is a top view of an exercise device according to a thirteenth embodiment of the invention.
Figure 24:
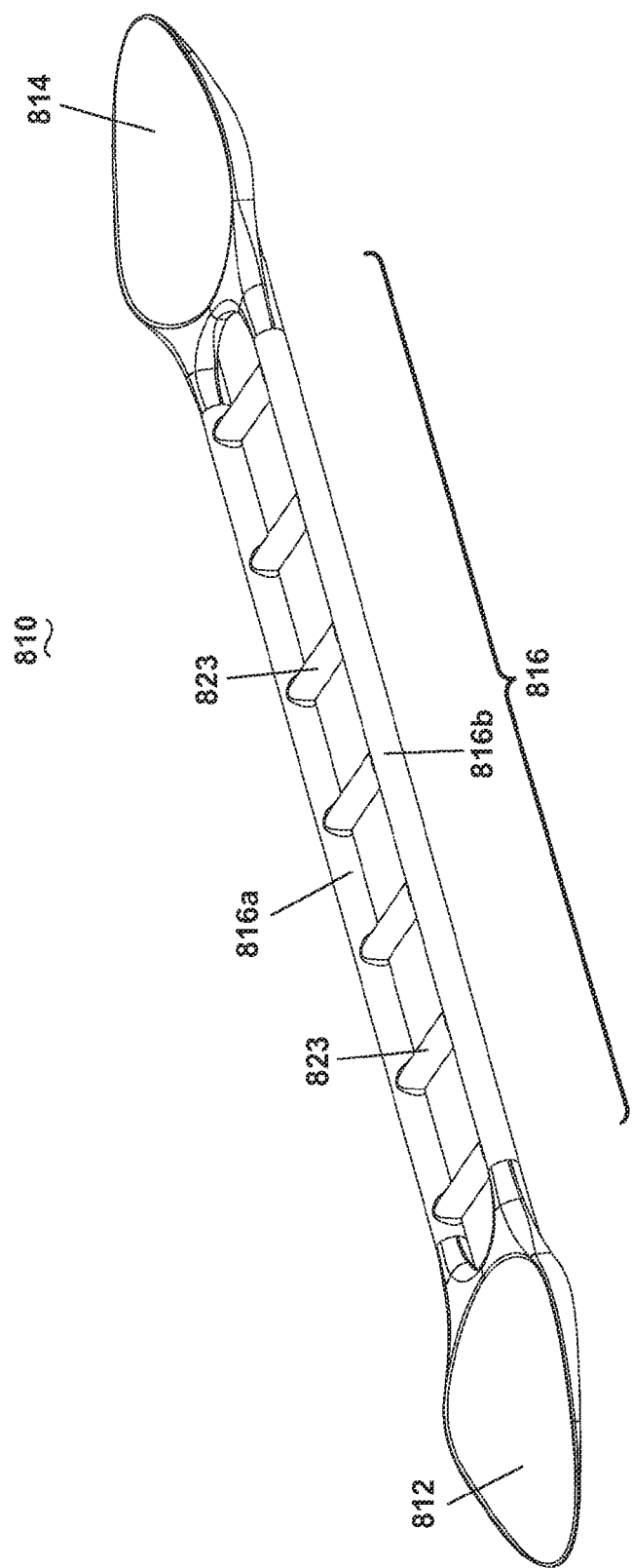
FIG. 24 is a perspective view of the exercise device of FIG. 23 according to the thirteenth embodiment of the invention.

FIGS. 23-24 illustrate another embodiment of the invention comprising an exercise device 810, which is similar to the exercise device 510 except for that the exercise device 810 does not include a coupling device. Therefore, elements in the exercise device 810 similar to those of exercise device 510 will be numbered with the prefix 800.

The exercise device 810 includes the first and second tool head 812 and 814 coupled at opposite ends of a shaft 816. The shaft 816 comprises a pair of parallel shaft arms 816a, b and a plurality of cross members 823 extending between the shaft arms 816a and 816b. The components of the exercise device 810 are not removably coupled as described above with respect to the exercise devices 510, 610 and 710, but rather the components of the device 810 are irremovably coupled.

The exercise devices 10, 310, 410, 510, 610, 710 and 810 can be made from any suitable materials or combination of materials, examples of which include, metal, wood and polymeric materials. The various components of the exercise devices 10, 310, 410, 510, 610, 710 and 810 can be removably coupled using any of the coupling devices 22, 122, 222, 522, 622 and 722 or any combination thereof. It is also within the scope of the invention for other types of coupling devices to be used. Removably coupling the components of the exercise devices 10, 310, 410, 510, 610, 710 and 810 allows the exercise devices to be disassembled into smaller pieces to facilitate ease of storage and transport.

The components of the exercise devices 10, 310, 410, 510, 610, 710 and 810 which are not removably coupled can be coupled using any known mechanical and/or non-mechanical fastener, depending on the materials the exercise devices 10, 310, 410, 510, 610, 710 and 810 are made from. Non-limiting examples of mechanical fasteners include, rivets, screws, stakes, staples and press studs. Non-limiting examples of non-mechanical fasteners include adhesives and welds. In addition, one or more components of the exercise devices 10, 310, 410, 510, 610, 710 and 810 can be integrally molded.

A method of use of the exercise devices 10 and 810 will now be described. While the methods are described in the context of one exercise device, it will be understood that the methods can be used with any of the exercise devices 10, 310, 410, 510, 610, 710 and 810 described above. While some of the exercises are illustrated using only one side of a user's body, it will be understood that the exercise can be conducted on both sides of a user's body, as is known in the art. The exercises described herein can be performed and repeated any number of times, in any order. In addition, while some of the exercises may be described as including scooping up some of a surface material in which the exercise is being performed on, it will be understood that any amount of surface material can be scooped up or that the exercise can be conducted without scooping up any material. Furthermore, while the methods are illustrated and discussed in the context of a female user, it will be understood that the exercise device and methods described herein can be used in the same manner by a male user.

Figure 25A:
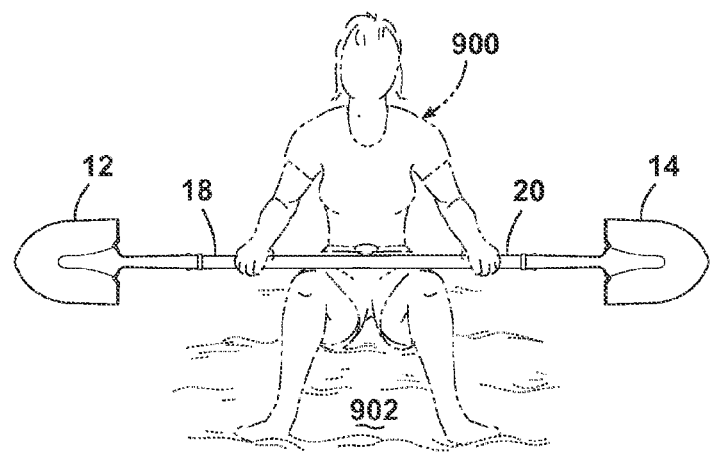
FIGS. 25A-25C illustrate a method of use of the exercise device of FIG. 1 according to a fourteenth embodiment of the invention.
Figure 25B:
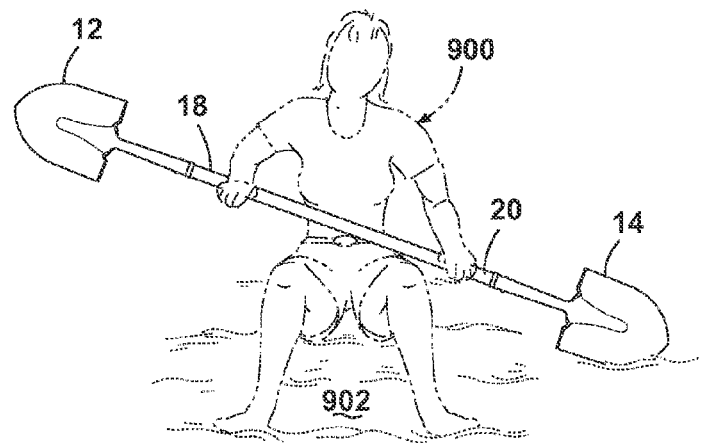

As illustrated in FIG. 25A, a user 900 can sit on a surface 902, such as sand, mud, gravel or snow, for example, with her feet resting on the ground, knees raised and slightly bent. The user 900 grasps the first and second handle portions 18 and 20 and holds the exercise device 10 away from the user's body, parallel to the user's chest, with arms slightly bent. As illustrated in FIG. 25B, the user 900 lowers the second tool head 14 towards the surface 902 until the second tool head 14 is at least partially submerged in the surface 902 and pushes or sweeps the tool head 14 through the surface 902 in a rearward direction relative to the user to simulate a paddling motion. Alternatively, the user 900 can push the second tool head 14 through the surface 902 in a forward direction relative to the user. The forwardly and/or rearwardly directed sweeps of the second tool head 14 can be repeated any desired number of times. The sweeping motion through the material making up the surface 902 can provide a variable or selectable amount of resistance to the user 900 depending upon the depth that the tool heads 12, 14 of the exercise device 10 are swept through the material making up the surface 902.

Figure 25C:
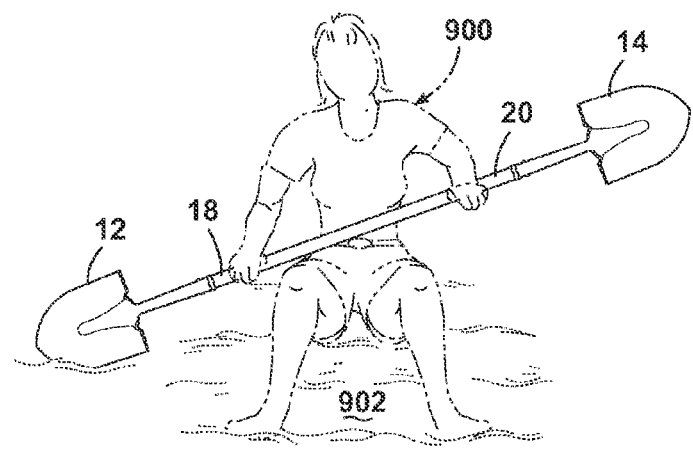

In another example, as shown in FIG. 25C, the sweep with the second tool head 14 can be alternated with a sweep using the first tool head 12. The sweeping motions with the first and/or second tool heads 12 and 14 can be used to work a user's shoulder, arm, back and abdominal muscles. The amount of resistance experienced by the user can be adjusted depending on the amount of the surface material, sand for example, that the user moves during the sweeping motion.

When the sweeping motion is done with an exercise device having a narrowed waist portion, such as the waist 417 in the exercise device 410 illustrated in FIG. 7B, the waist 417 can provide a more comfortable fit to the user's body during the sweeping motion.

While the exercises illustrated in FIGS. 25A-C show the user performing the exercises while sitting, these types of exercises can also be performed while the user is standing, kneeling or in a squatting position in which the user is standing with knees bent.

Figure 27:
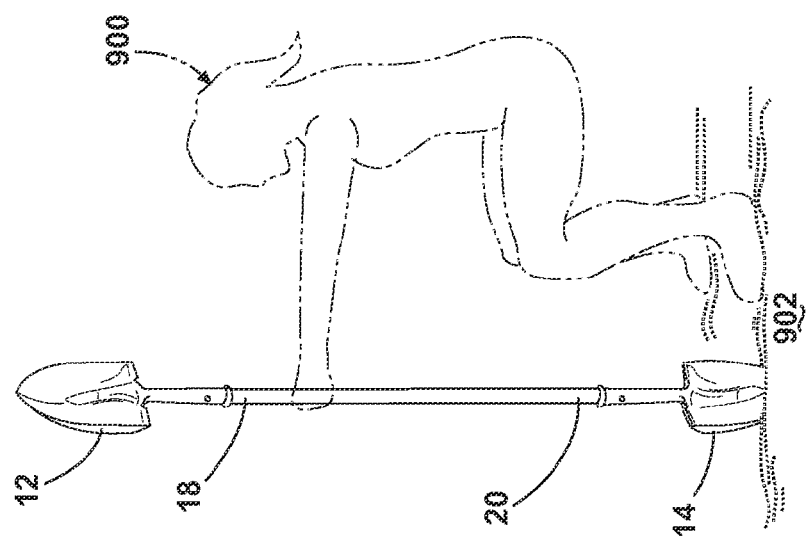
FIG. 27 illustrates a method of use of the exercise device of FIG. 1 according to a sixteenth embodiment of the invention.
Figure 26:
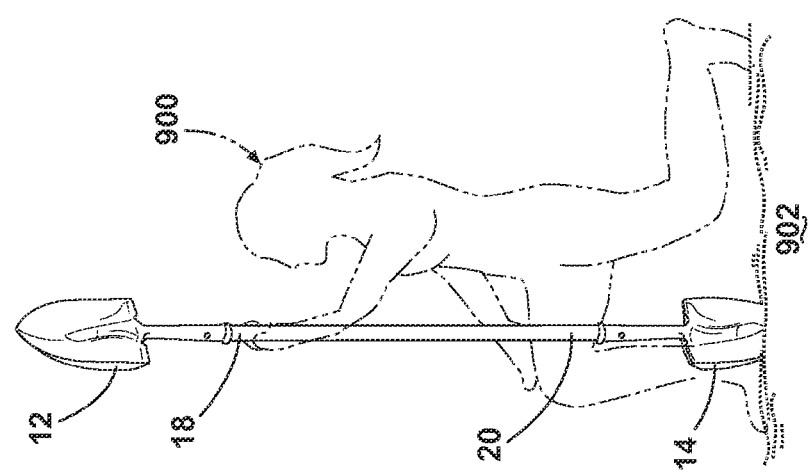
FIG. 26 illustrates a method of use of the exercise device of FIG. 1 according to a fifteenth embodiment of the invention.
Figure 28A:
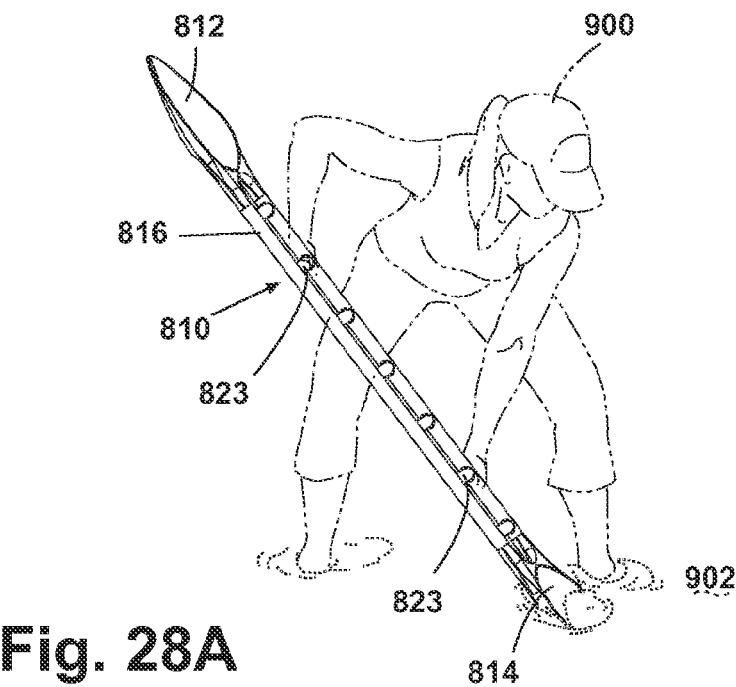
FIGS. 28A-28B illustrate a method of use of the exercise device of FIG. 23 according to a seventeenth embodiment of the invention.
Figure 28B:
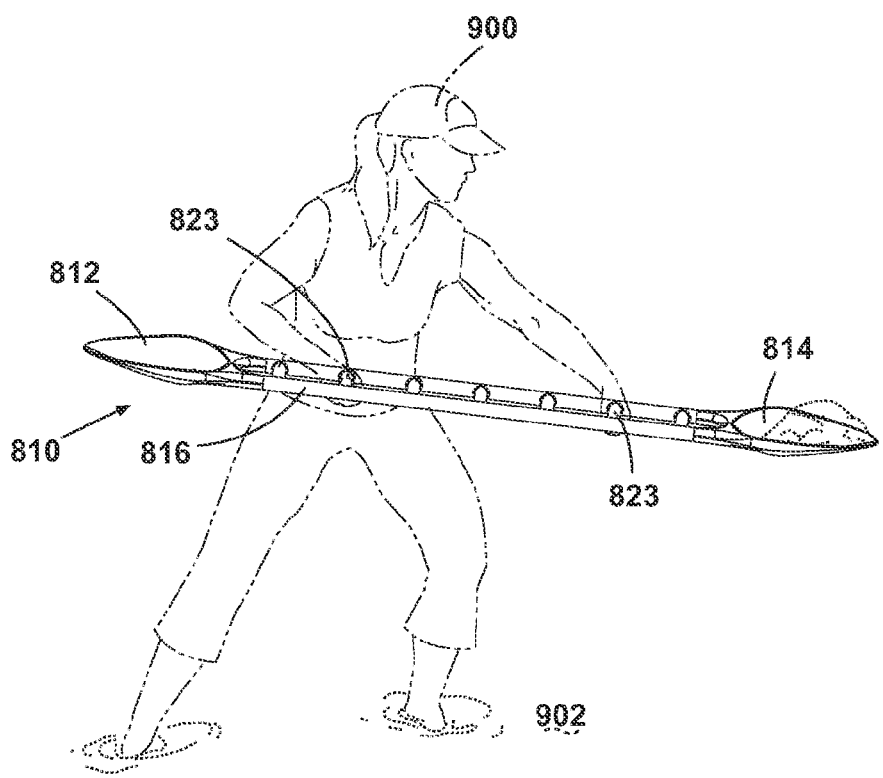

Another method of use is illustrated in FIGS. 26 and 27. The user 900 can insert the second tool head 14 into the surface 902 and use the exercise device 10 as a support when performing lunges, as illustrated in FIG. 26, or squats, as shown in FIG. 27. The lunges and squats can be stationary, or walking lunges and squats in which the tool head 14 is repeatedly inserted and removed from the surface 902 as the user 900 walks forward and performs a lunge and/or squat. The exercise device 10 can also be used in a similar manner by a user as a support when performing kicks. In this manner, the exercise device 10 can also be used to train additional muscle groups such as the core muscle groups and leg muscles.

Additional examples of exercises a user can perform to strengthen arm core and back muscles include: repeating the process on alternating sides of a user's body of using a tool head 12, 14 to lift sand and toss it behind the user; while standing, sweep a tool head 12, 14 back and forth through the sand, repeating the process on alternating sides; and repeating the process on alternating sides of a user's body of digging a tool head 12, 14 through the sand and tossing the sand in a forward direction away from the user.

Several additional exercises can be performed by a user to strengthen chest and core muscles. For example, a user can place the exercise device 10 on a surface, kneel down in front of the exercise tool 10, grasp the shaft 16 with both hands and perform a military push up. In another example, rather than doing a push up, a user can grasp the shaft 16 and raise his/her body to a plank position. In yet another example, a user can lie parallel to the exercise device 10, place one elbow down in the sand and raise his/her body to a side plank position while using the other arm to raise the exercise device 10 off the surface and hold in place for some amount of time.

In yet another example, the user can rest the shaft 16 across his/her shoulders while grasping the shaft 16 with both hands and twist from left to right, turning at the waist. A variation of this exercise involves repeating the same movement while in a crouched position with knees bent. Another variation of this exercise involves bending from side to side at the waist. Another example of an exercise that can be performed with the exercise device 10 involves a user lying on her back, grasping the shaft 16 with both hands and raising the exercise device 10 above her chest while also raising her legs straight up into the air and alternately raising a tool head 12, 14 to her feet. Another example of an exercise a user can perform while lying on her back involves raising the exercise device 10 above her chest with knees bent, feet on the ground, while slowing moving the exercise device up and down while performing an abdominal crunch.

FIGS. 28-32 illustrate methods of use of the exercise device 810 for working the user's core, legs, arms, back, chest and combinations thereof. FIGS. 28A and 28B illustrate a method in which the user 900 grasps the exercise device 810 by the cross members 823 and digs one of the tool heads 812, 814 into the surface 902, scoops up some of the surface material and then tosses the surface material away from the user 900. As illustrated in FIG. 28A, the user 900 inserts the second tool head 814 into the surface 902, which may be water or sand, for example. As illustrated in FIG. 28B, the user scoops up some of the material from the surface 902 in the second tool head 814 and tosses it away from the user. The movements illustrated in FIGS. 28A and 28B can be repeated multiple times on both sides of the user's body using both the first and second tool heads 812 and 814 in a similar manner. Similar exercises can be conducted in which the user 900 tosses the surface material to the side, front or rear of the user 900.

Figure 29A:
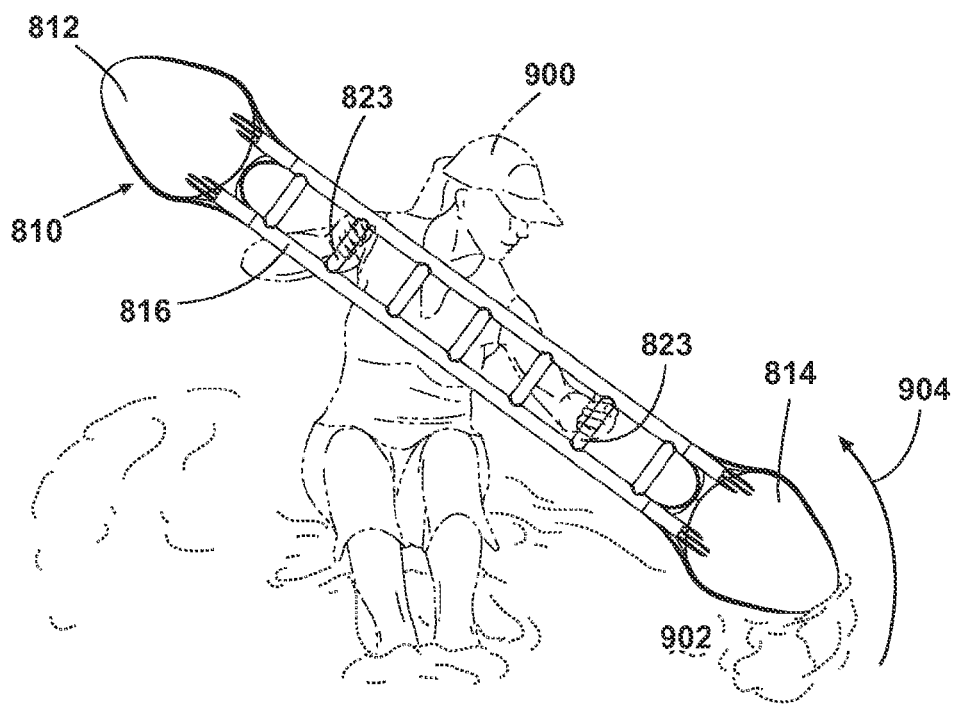
FIGS. 29A-29B illustrate a method of use of the exercise device of FIG. 23 according to a eighteenth embodiment of the invention.
Figure 29B:
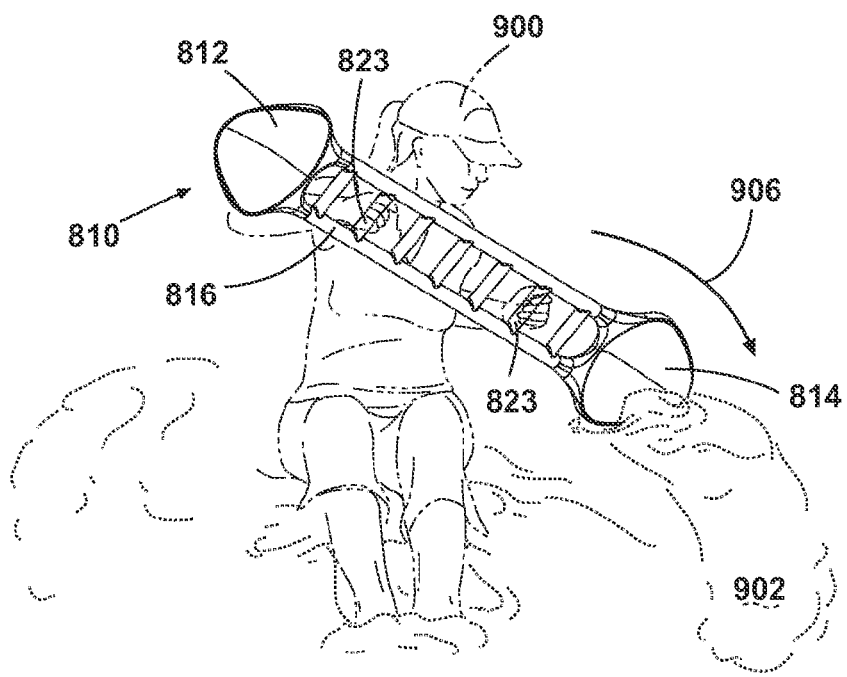

FIGS. 29A and 29B illustrate a method of use in which the user 900 is sitting on the surface 902 with knees bent and raised in front of the user 900. As illustrated in FIG. 29A, the user 900 inserts the second tool head 814 into the surface 902 slightly forward of the user's knees and then draws or sweeps the second tool head 814 through the surface 902 towards a rear of the user's body, as illustrated by arrow 904. The user 900 can then repeat the motion in the opposite direction as illustrated by arrow 906 in FIG. 29B. The method can then be repeated on the opposite side of the user's body using the first tool head 812. The exercise can also be conducted in a similar manner while the user 900 is kneeling on both knees.

Figure 30A:
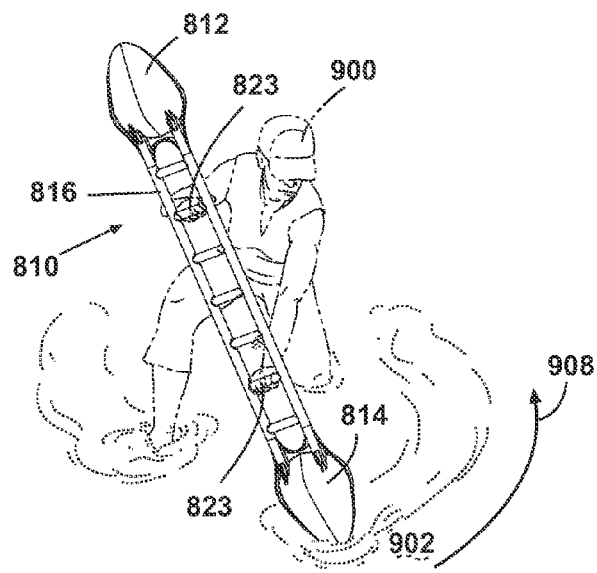
FIGS. 30A-30C illustrate a method of use of the exercise device of FIG. 23 according to an nineteenth embodiment of the invention.
Figure 30B:
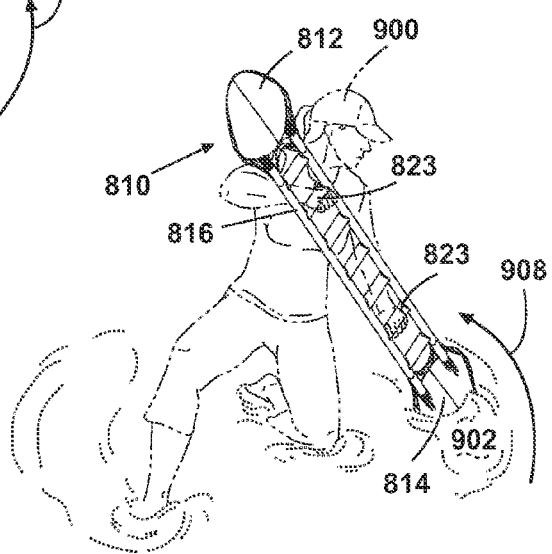
Figure 30C:
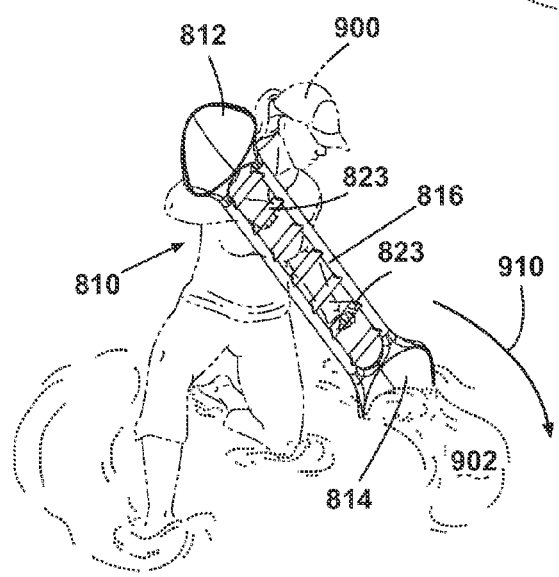

FIGS. 30A-30C illustrate a method of use in which the user 900 is kneeling on the surface 902 with one knee while the other knee is bent and raised above the surface 902. As illustrated in FIGS. 30A-30B, the user 900 grasps the cross members 823, inserts the second tool head 814 into the surface 902 and then sweeps the second tool head 814 through the surface 902 towards the rear of the user's body as illustrated by arrow 908. The user 900 can then reverse the sweeping motion and sweep the second tool head 814 through the surface 902 towards a front of the user's body as illustrated by arrow 910.

Figure 31A:
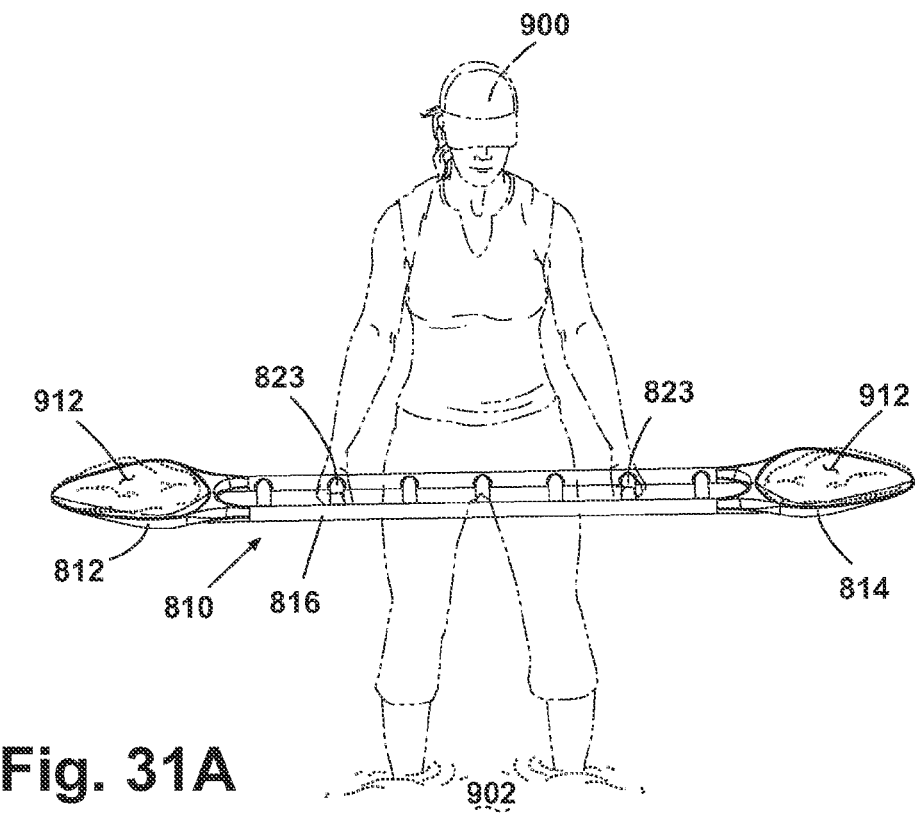
FIGS. 31A-31B illustrate a method of use of the exercise device of FIG. 23 according to a twentieth embodiment of the invention.
Figure 31B:
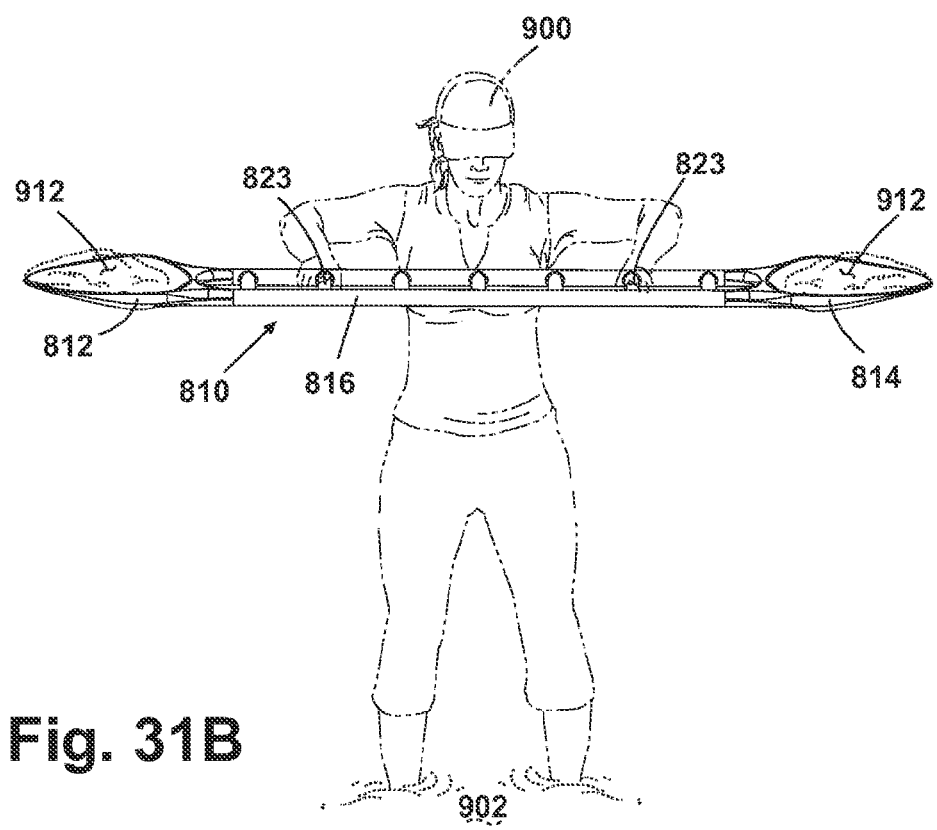

FIGS. 31A and 31B illustrate a method of use in which the user 900 scoops up some of a surface material 912 of the surface 902 into each of the tool heads 812, 814 and lowers and lifts the exercise device 810, as shown in FIGS. 31A and 31B, respectively. The amount of surface material 912 in each of the tool heads 812, 814 can be varied by the user 900 to vary the intensity of the exercise.

Figure 32A:
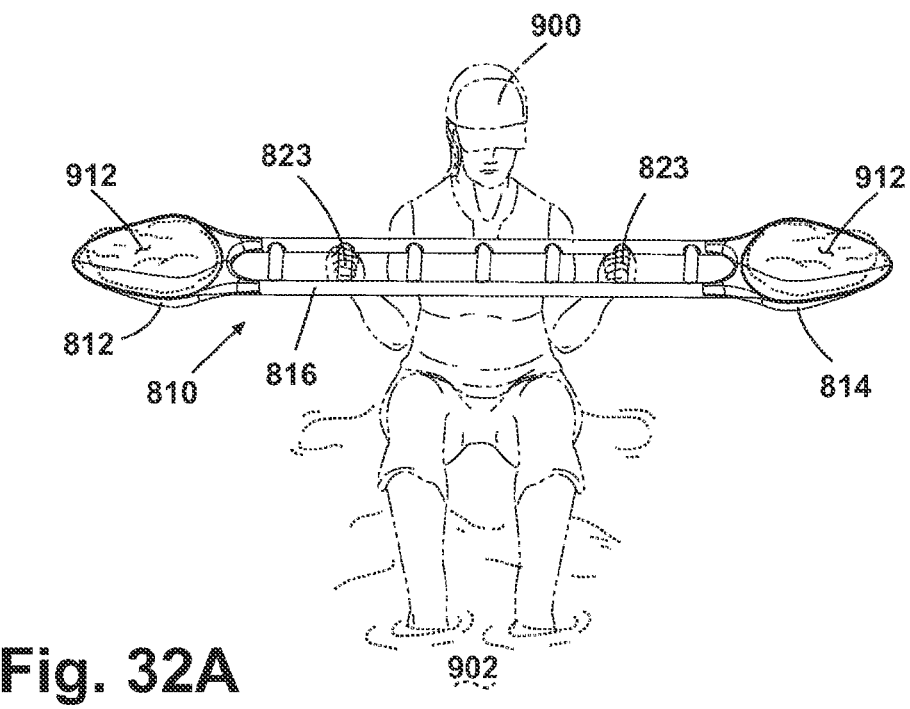
FIGS. 32A-32B illustrate a method of use of the exercise device of FIG. 23 according to a twenty first embodiment of the invention.
Figure 32B:
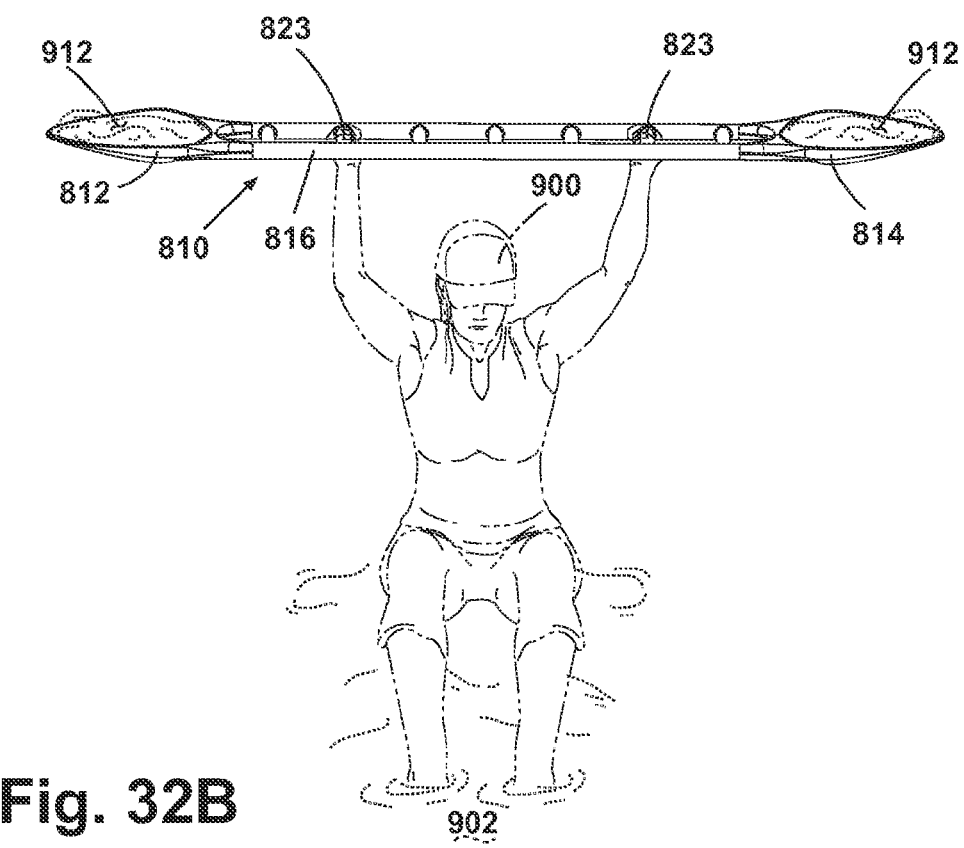

FIGS. 32A and 32B illustrate a method of use in which the user 900 is sitting on the surface 902 with knees bent and raised in front of the user 900. The user 900 first scoops up some of the surface material 912 into each of the tool heads 812, 814 and then holds the exercise device 810 so that the shaft 816 is generally parallel to the surface 902. The user 900 then lifts the exercise device 810 from a first position generally level with the user's shoulders, illustrated in FIG. 32A, to a second position above the user's head, illustrated in FIG. 32B. The exercise device 810 can then be lowered again to the first position illustrated in FIG. 32A and the process repeated.

Figure 33A:
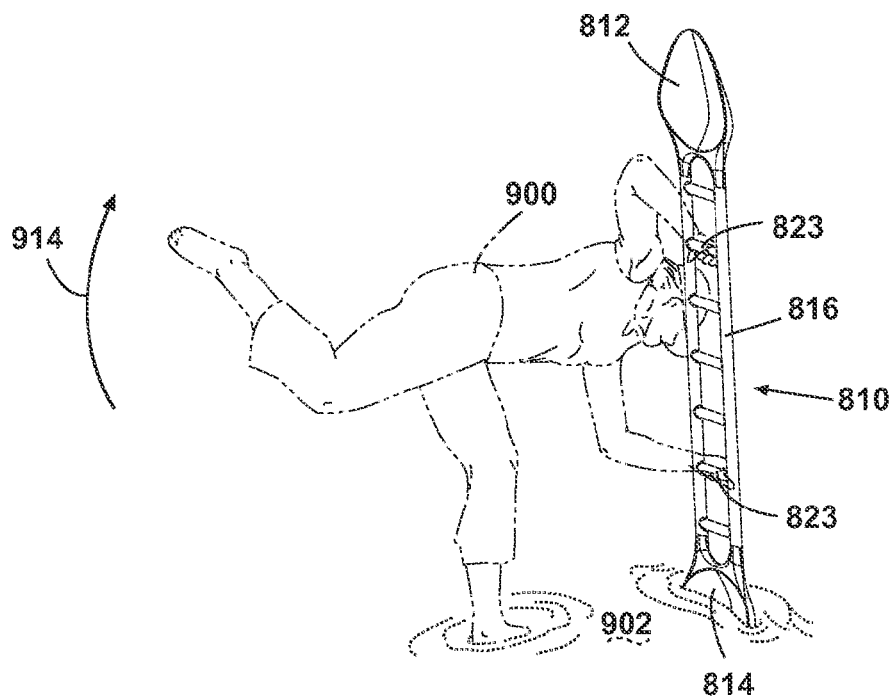
FIGS. 33A-33B illustrate a method of use of the exercise device of FIG. 23 according to a twenty second embodiment of the invention.
Figure 33B:
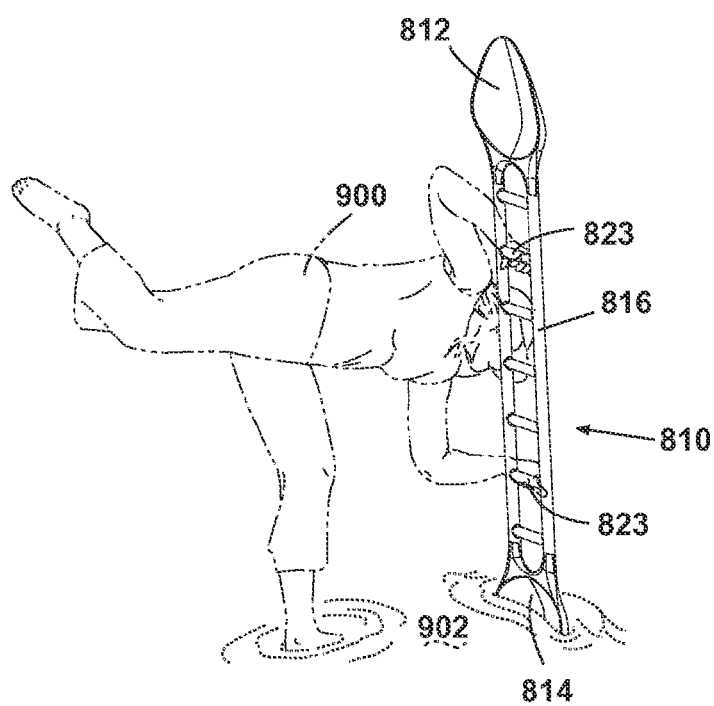

As illustrated in FIG. 33A, the user 900 can insert the second tool head 814 into the surface 902 and grasps the cross members 823 to support the user 900 while exercising her legs. The user 900 bends at the waist and extends one leg back, with knee slightly bent. The user 900 then raises the leg as illustrated by arrow 914 to a raised position illustrated in FIG. 33B. The user 900 can then lower the leg back to the position illustrated in FIG. 33A and the process can be repeated. The user 900 can then switch legs to work the opposite leg.

Figure 34A:
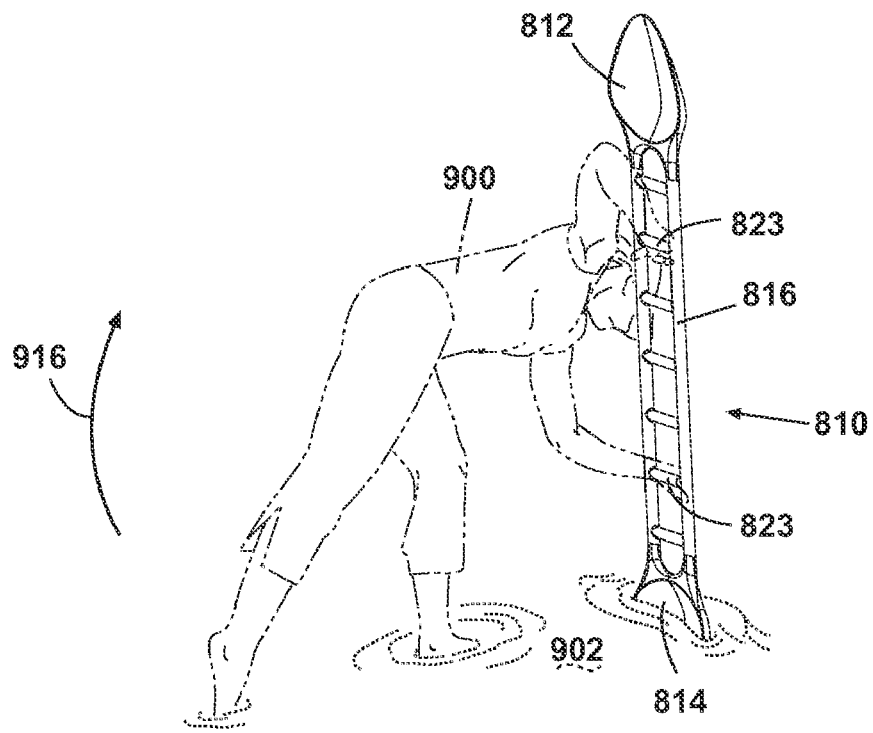
FIGS. 34A-34B illustrate a method of use of the exercise device of FIG. 23 according to a twenty third embodiment of the invention.
Figure 34B:
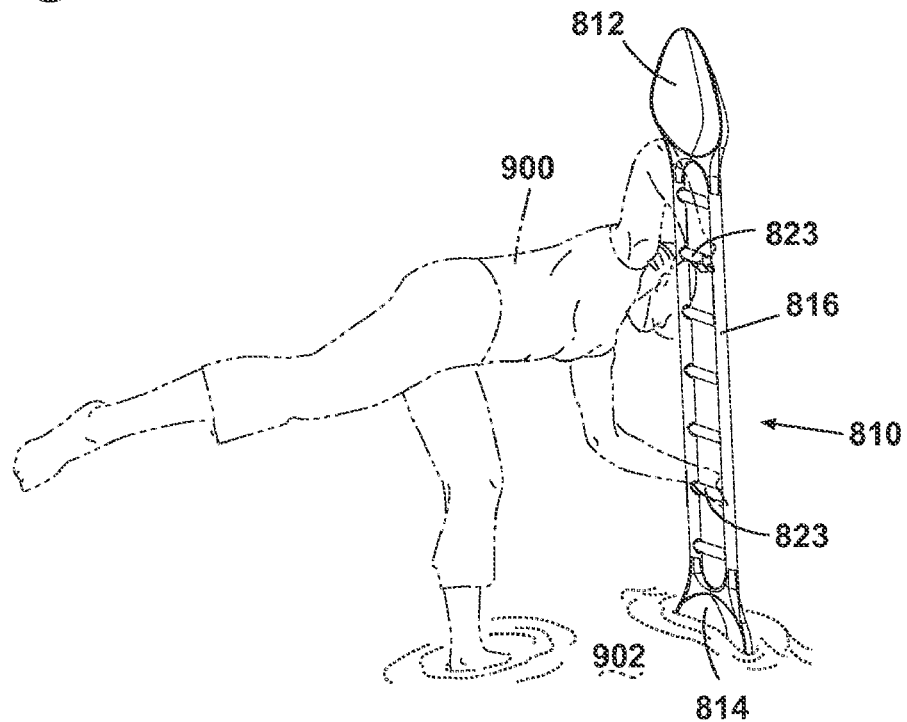

FIGS. 34A and 34B illustrate another method comprising lifting the leg. The exercise device 810 can be inserted into the surface 902 and grasped by the user 900 in the same manner as described above with reference to FIGS. 33A and 33B. The user 900 then extends one leg back straight back and lifts the leg as illustrated by arrow 916 to a raised position illustrated in FIG. 34B. The leg can then be lowered back down to the position illustrated in FIG. 34A and the process repeated. The user 900 can then switch legs to work the opposite leg.

Figure 35A:
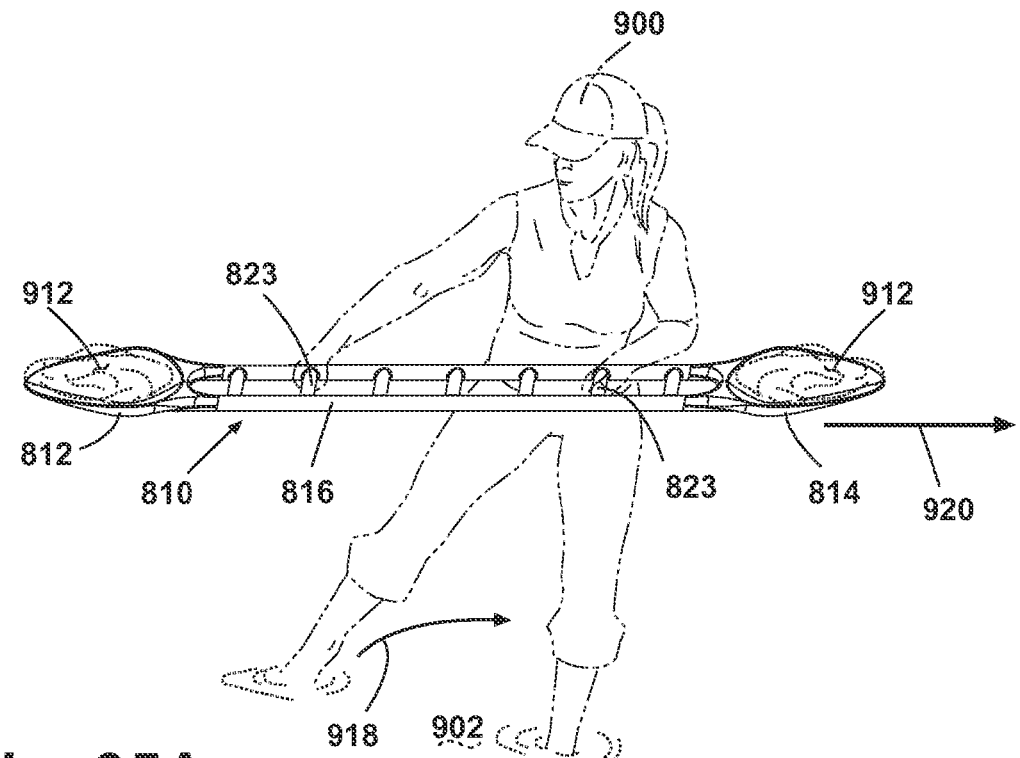
FIGS. 35A-35B illustrate a method of use of the exercise device of FIG. 23 according to a twenty fourth embodiment of the invention.
Figure 35B:
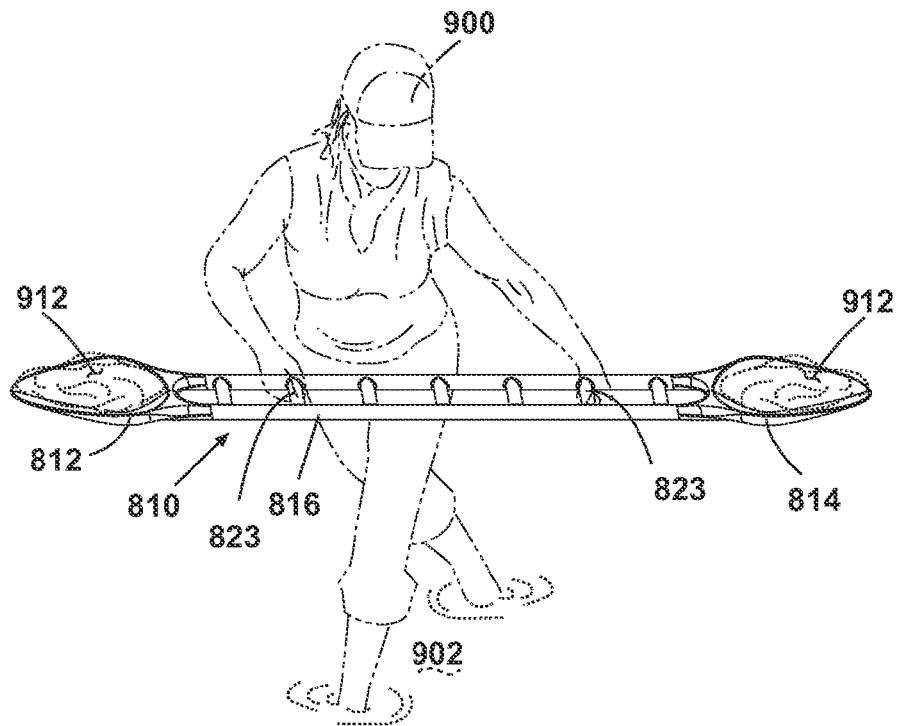

FIGS. 35A and 35B illustrate a method of use in which the user 900 moves both the exercise device 810 and a leg. As illustrated in FIG. 35A, the user 900 starts with holding the exercise device 810 parallel to the surface 902 at approximately waist height with some of the surface material in each of the first and second tool heads 812, 814. The user 900 stands in a slightly widened stance with one leg outstretched in the same direction as the first tool head 812 and shifts the first tool head 812 in the same direction away from the user's body. As illustrated by arrows 918 and 920, the user 900 then sweeps the outstretched leg behind the other leg and shifts the exercise device 810 to the opposite side of the body to the position illustrated in FIG. 35B.

Figure 36A:
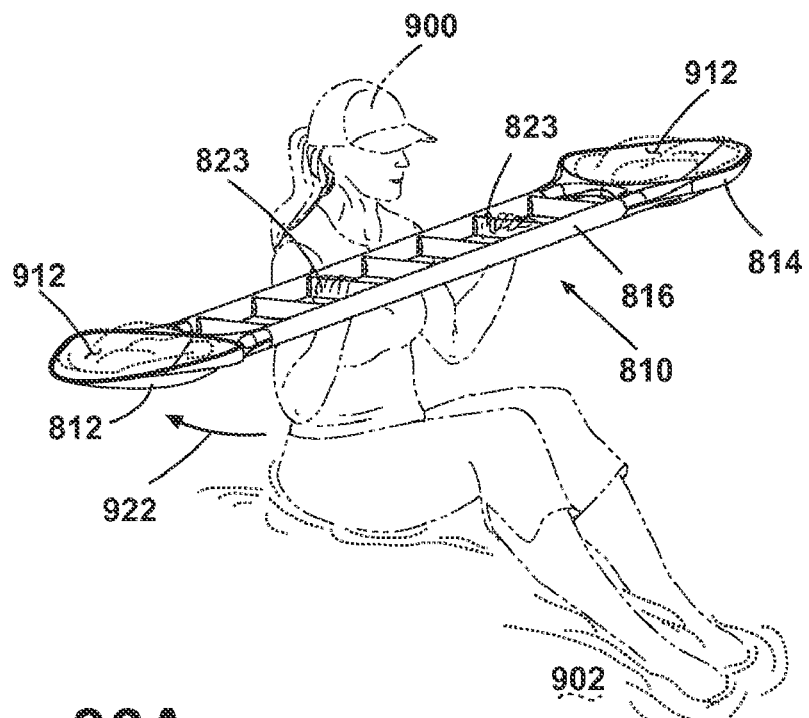
FIGS. 36A-36B illustrate a method of use of the exercise device of FIG. 23 according to a twenty fifth embodiment of the invention.
Figure 36B:
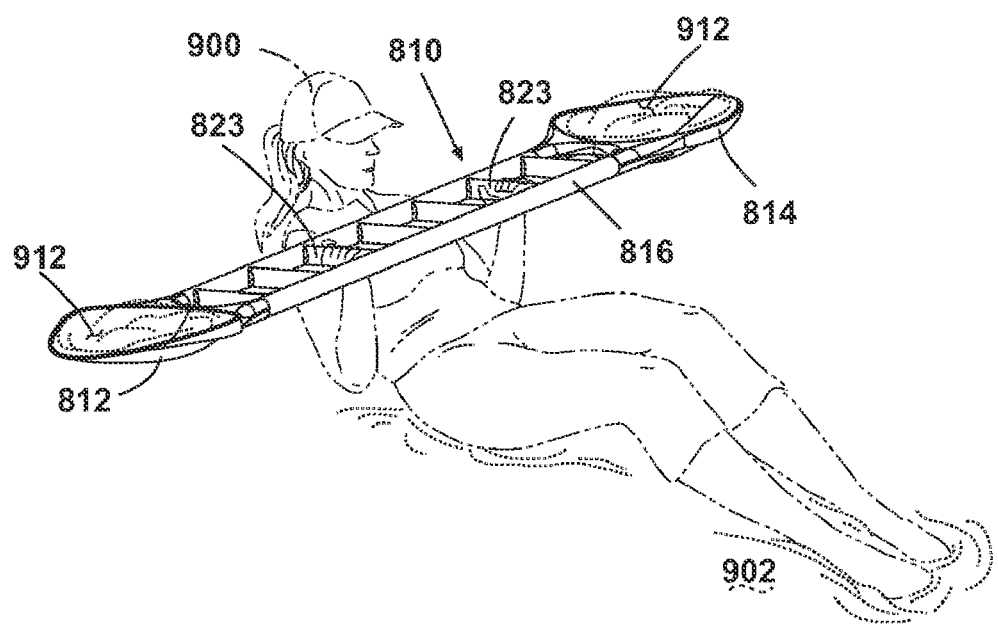

FIGS. 36A and 36B illustrate a method of use in which the user 900 is seated on the surface 902 with legs outstretched and knees slightly bent and raised. As illustrated in FIG. 36A, the user 900 can start the exercise by grasping the cross members 823 and holding the exercise device 810 generally parallel with the surface 902 at shoulder height. Each of the first and second tool heads 812, 814 can hold some of the surface material 912. As indicated by arrow 922, the user 900 can then lean back to the position illustrated in FIG. 36B. The motion can then be reversed and the user 900 can return to the position illustrated in FIG. 36A, performing an abdominal crunch.

Figure 37A:
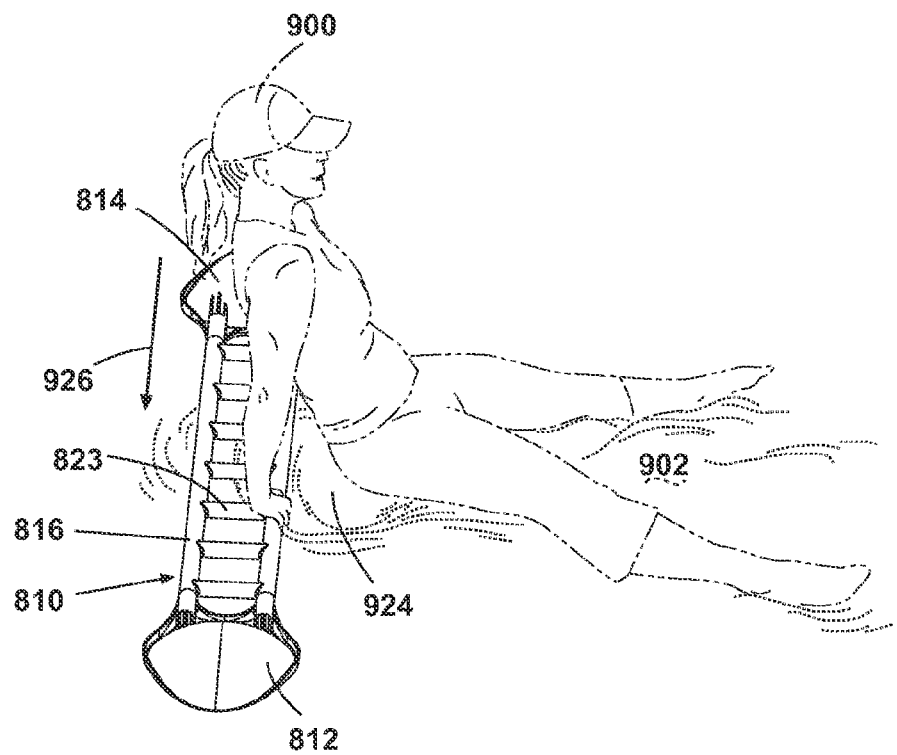
FIGS. 37A-37B illustrate a method of use of the exercise device of FIG. 23 according to a twenty sixth embodiment of the invention.
Figure 37B:
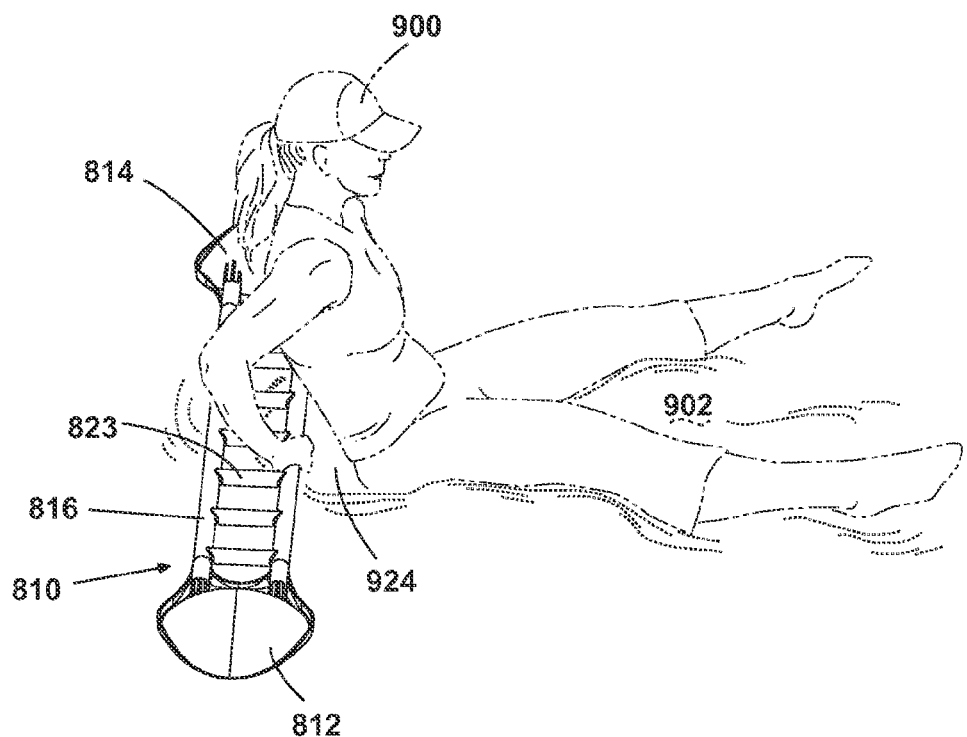

FIGS. 37A and 37B illustrate a method of use in which the user 900 has first dug a hole 924 in the surface 902. The user 900 then places the exercise device 810 on the surface 902 adjacent the hole 924 and grasps the shaft 816 with arms straightened, legs outstretched on the surface 902 with the user's gluteus muscles positioned over the hole 924. The user 900 then bends her arms as indicated by arrow 926 and lowers herself into the hole 924 to the position illustrated in FIG. 37B. The user 900 can then straighten her arms to lift herself out of the hole 924 to return to the position illustrated in FIG. 37A.

Figure 38A:
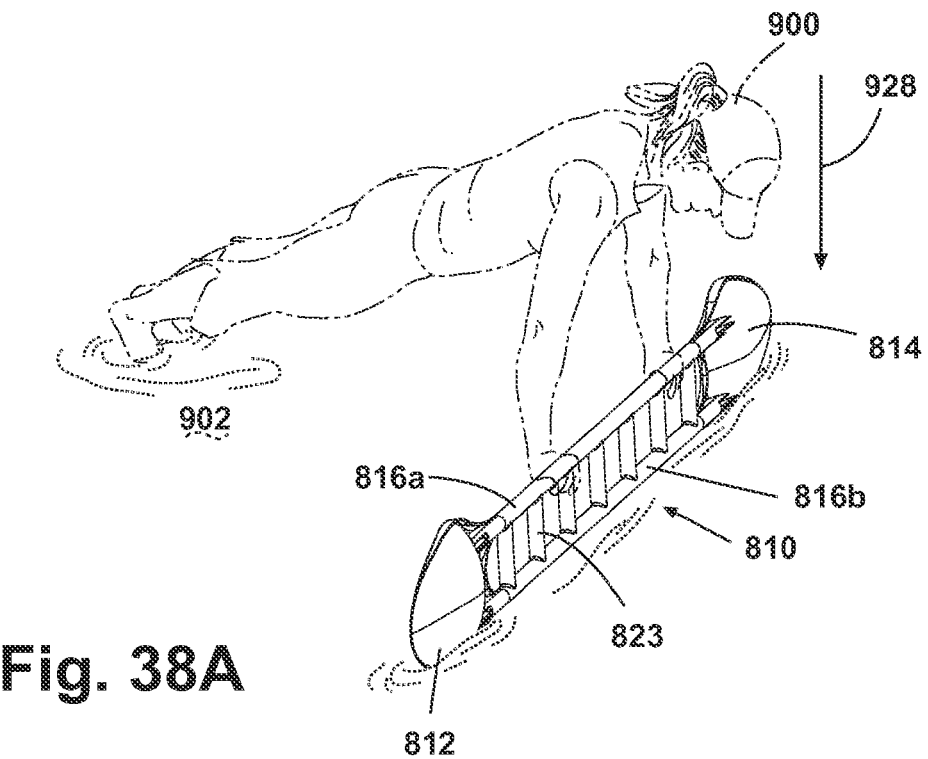
FIGS. 38A-38B illustrate a method of use of the exercise device of FIG. 23 according to a twenty seventh embodiment of the invention.
Figure 38B:
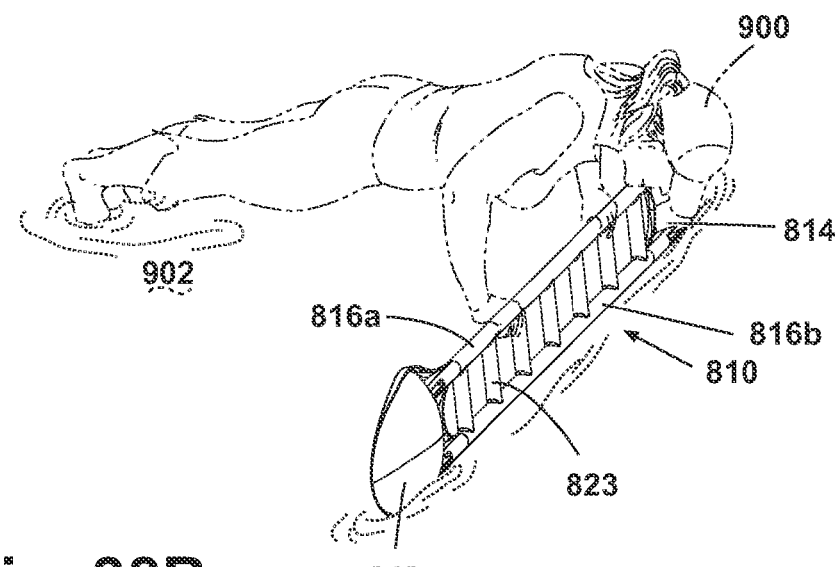

FIGS. 38A and 38B illustrate a method of use in which the user 900 places one shaft arm 816a, b adjacent the surface 902 and uses the other of the shaft arms 816a, b to support herself. As illustrated in FIG. 38A, the user 900 gets into a plank-type position, supporting her body at one end on the balls of her feet and at the opposite end with her arms in a straightened position, grasping the shaft arm 816a. The user 900 then bends her arms as indicated by arrow 928 and lowers her upper body to the position illustrated in FIG. 38B. The user 900 can then straighten her arms to raise her upper body back to the position illustrated in FIG. 38A.

In another example, the user can perform half or full bicep curls while holding different cross-members 823 at different distances with or without surface material in the tool heads 812, 814. The exercise can be performed while the user is sitting or standing. In another exercise, the user can hold the exercise device 810 behind her head with elbows bent, raising the exercise device 810 to the user's ears and then lowering the exercise device 810 towards the user's shoulders.

In yet another exercise, the user can place the exercise device 810 on a surface to perform a push-up and then jump up to a standing position while raising the exercise device 810 over the user's head.

Another example includes placing the exercise device 810 on the surface and the user grasps the shaft 816 to perform a variety of push-up type moves. The push-ups can be conducted with the user grasping the shaft 816 with various distances between the user's hands for working different muscle groups.

In yet another example, the user can use the exercise device 810 to dig a trench or hole and the user can step in and out of the hole. In another example, the user can hold the exercise device 810 parallel to the surface, with or without surface material in the tool heads 812, 814, and perform walking lunges. The exercise can also be conducted while the user is on her toes. In another example, rather than lunges, the user can squat down with legs apart, toes pointing out and walk forward. In another example, the user can step to one side with a first leg and sweep the other leg to the same side behind the first leg.

In another example, the user can insert the exercise device 810 into the surface and use it to steady herself as she performs calf raises by flexing up onto her toes and back down again. In another example, the user can grasp the exercise device 810, bend at the waist, lift one leg with toe pointed and sweep the leg side to side.

In yet another example, the user can hold the exercise device 810 at shoulder height, with or without surface material and perform multiple forward walking squats or lunges and then multiple backward walking squats or lunges. In another example, the user can hold the exercise device 810, with or without surface material, and perform a variety of motions such as a hop, a swing kick high, a swing kick low and a leap.

In another example, the user can hold the exercise device 810 and perform chopping motions up and down, side to side. The movements can be performed while standing or kneeling.

In another example, the user can hold the exercise device 810 in front of the user, raise the exercise device 810 two inches and hold, with or without surface material. Alternatively, the user can twist back to one side two inches and hold and then repeat on the opposite side.

In another example, the user can lie flat on the surface and hold the exercise device 810, with or without surface material, above the user's body. The user can then raise and lower her knees above the surface. Alternatively, the user can sweep one leg upwards and downwards in a circular motion. In another modification, the user can raise both her upper and lower body up into a V-shape while holding the exercise device 810. In another modification, while in the V-shape position, the user can spread her legs and then bring them back together in a scissor-type motion. In yet another modification, while holding the exercise device 810, the user can roll up from the surface to a seated position and extend her upper body and the exercise device 810 over the user's toes.

The exercise devices described herein provide an easy to use, effective and portable workout tool that a user can use to perform a variety of different exercises in an indoor or outdoor environment. A user can perform a variety of exercises to train a variety of different muscle groups such as shoulder, arm, back, abdominal, core and leg muscles, without the use of multiple, complex and expensive equipment. The exercise device can be provided with a coupling device to facilitate breaking down the exercise device into smaller components, making the exercise device easier to transport and store and facilitating quick assembly when the user is ready to exercise. In addition, the ability to attach different tool heads to the exercise device provides the user with a variety of options for performing exercises with a variety of different surface materials.

The exercise devices described herein provide the user with the ability to adjust the intensity of an exercise simply by modifying the amount of surface material carried by the tool heads when the tool heads are in the form of a scooping member, such as a shovel or spade, or the depth with which the tool heads are inserted into the surface, depending on the type of exercise. In this manner, the user can adjust the intensity of her workout without having to bring additional material to the workout location or without having to assemble or disassemble components of the exercise device, such as may be the case for other types of exercise equipment which utilize weights and resistance bands to vary the intensity of an exercise. For example, if the exercises are being conducted on sand, the user can increase the amount of sand scooped up in the tool heads to increase the intensity of the workout or decrease the amount of sand scooped up in the tool heads to decrease the intensity of the workout. In another example, if the user is exercising on a beach near water, the amount of sand or water in a sand bag or water container can be varied to vary the intensity of the workout. Many of the tool heads are designed to be able to hold various amounts of surface material as desired by the user for adjusting the intensity of the user's workout.

The exercise devices as described herein are made from materials and assembled in such a manner as to provide the exercise device with sufficient structural rigidity to support the user's weight and interact with the surface as desired when conducting the exercises with the exercise device. For example, the tool heads are provided with sufficient rigidity to be able to be swept through the surface material or inserted into the surface material without breaking or deforming. One of the tool heads can be inserted into the ground and the user can grasp the shaft of the exercise device for balance and stability while performing exercises. The tool heads and the shaft are also provided with sufficient rigidity and structural support such that the surface material can be scooped and lifted using the exercise device. In addition, the shaft itself is provided with sufficient strength to support a user's body weight when conducting exercises, such as those illustrated in FIGS. 37A, B and 38A, B.

A shaft having parallel shaft arms connected by a plurality of cross members provides the exercise devices described herein with additional strength and also provides a number of spaced hand-grips for use during exercises with the exercise devices. The cross members provide the exercise devices with additional structural support and rigidity to withstand the scooping, sweeping and insertion of the exercise device into the surface and also to support a user's body weight during exercises. In addition, the cross members and the parallel shaft arms provide the user with a variety of different hand placement options to work different muscle groups and perform various exercises with the exercise device.

The exercise devices described herein provide the user with a device that can be used to achieve the fitness benefits of sports such as rowing, sculling or kayaking without the need for expensive equipment such as a boat or a complex exercise machine having multiple moving parts in combination with the ability to perform additional exercises to work additional muscle groups. The exercise device is easily transportable to any location the user desires to train in such as the beach or in the snow in the user's yard. The exercise devices also allow a user to perform a variety of modifications of traditional of upper body, lower body and abdominal exercises with variable intensity in an outdoor setting selected by the user.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An exercise device for use by a user on a selected surface material comprising:
    a grasping member having a first end and a second end;
    a first tool head mounted to the first end of the grasping member; and
    a second tool head mounted to the second end of the grasping member;
    wherein each of the first tool head and the second tool head have sufficient structural rigidity to be interacted with the surface material without significant deformation, and whereby a user can perform exercises upon the selected surface material by physically interacting the first tool head and second tool head with the surface material;
    wherein the grasping member comprises at least two rods extending between the first tool head and the second tool head, generally in parallel relationship with one another, and further including a plurality of at least three cross members extending between the at least two rods with each forming a rigid handle, whereby a user can selectively grasp the plurality of cross members as well as the at least two rods while exercising.

2. The exercise device of claim 1 wherein at least one of the first tool head and the second tool head comprises a scooping member adapted to collect the surface material therein as it is dragged across the surface material.

3. The exercise device of claim 2 wherein the grasping member comprises at least two rods extending between the first tool head and the second tool head, generally in parallel relationship with one another, and wherein the scooping member on each of the first tool head and the second tool head has a scooping plane generally planar with the at least two rods and the at least three cross members.

4. The exercise device of claim 1 wherein at least one of the first tool head and the second tool head comprises a tool head selected from a shovel head, a pitchfork, a snow shovel head, a rake, and a spade.

5. The exercise device of claim 4 wherein the first tool head and the second tool head are formed as the same tool head as the other.

6. The exercise device of claim 1 wherein the surface material comprises at least one of sand, dirt, water, snow, mud and gravel.

7. The exercise device of claim 1 wherein the first tool head and the second tool head are formed integrally with the grasping member.

8. The exercise device of claim 1 wherein the first tool head and the second tool head are detachably mounted to the grasping member.

9. The exercise device of claim 8 wherein the first tool head and the second tool head are mounted to the grasping member by at least one of a set screw, a quick-release coupler, a releasable detent mechanism, a screw-nut assembly and combinations thereof.

10. The exercise device of claim 1 wherein the grasping member comprises a plurality of sections detachably coupled to one another by a coupling device.

11. The exercise device of claim 10 wherein the coupling device is selected from at least one of a set screw, a quick-release coupler, a releasable detent mechanism and a screw-nut assembly.

12. The exercise device of claim 1 wherein a user positioned on the surface material can exercise with the exercise device by alternately sweeping the first tool head and the second tool head across the surface material, collecting some of the surface material in each of the first tool head and the second tool head on alternate passes, and dispensing the collected surface material on a subsequent pass.

13. The exercise device of claim 1 wherein a user can simulate lifting weights with the exercise device by placing a selected amount of the surface material within each of the first tool head and the second tool head and periodically lifting and lowering the exercise device, with the selected amount of surface material providing the exercise device with additional weight.

14. The exercise device of claim 1, wherein the cross members include at least seven cross members.

15. The exercise device of claim 1, wherein the cross members and the at least two rods have similar shapes and diameters to facilitate similar gripping as the user switches between them.

16. The exercise device of claim 1, wherein at least one cross member is located in a longitudinally centered position along the two rods.

* * * * *